United States Patent
Knopf

(10) Patent No.: US 11,025,428 B2
(45) Date of Patent: Jun. 1, 2021

(54) SYSTEMS AND METHODS FOR ENABLING TRUSTED COMMUNICATIONS BETWEEN CONTROLLERS

(71) Applicant: Neustar, Inc., Sterling, VA (US)

(72) Inventor: Brian R. Knopf, Woodland Hills, CA (US)

(73) Assignee: Neustar, Inc., Sterling, VA (US)

( * ) Notice: Subject to any disclaimer, the term of this patent is extended or adjusted under 35 U.S.C. 154(b) by 240 days.

(21) Appl. No.: 15/652,098

(22) Filed: Jul. 17, 2017

(65) Prior Publication Data

US 2018/0013569 A1    Jan. 11, 2018

Related U.S. Application Data

(63) Continuation-in-part of application No. 15/588,533, filed on May 5, 2017, now Pat. No. 10,404,472.
(Continued)

(51) Int. Cl.
*H04L 9/32* (2006.01)
*H04L 9/00* (2006.01)
(Continued)

(52) U.S. Cl.
CPC ............ *H04L 9/3247* (2013.01); *H04L 9/006* (2013.01); *H04L 9/088* (2013.01); *H04L 9/0891* (2013.01);
(Continued)

(58) Field of Classification Search
CPC ....... H04L 63/08; H04L 9/321; H04L 9/3247; H04L 9/006; H04L 2209/84
See application file for complete search history.

(56) References Cited

U.S. PATENT DOCUMENTS 5,455,865 A    10/1995    Perlman
5,715,314 A    2/1998    Payne et al.
(Continued)

FOREIGN PATENT DOCUMENTS

EP    0683582 A1    11/1995
KR    20130083619 A    7/2013

OTHER PUBLICATIONS

Abe, Tsuyoshi et al., "Implementing Identity Provider on Mobile Phone," 2007, ACM, pp. 46-52.
(Continued)

*Primary Examiner* — Daniel B Potratz
(74) *Attorney, Agent, or Firm* — Sterne, Kessler, Goldstein & Fox, P.L.L.C.

(57) ABSTRACT

Systems and methods are described that enable trusted communications between two entities. In one implementation, a controller of a vehicle may include one or more processors configured to receive data and a controller signature from a second controller of the vehicle. The controller signature may be generated based on at least a first portion of the data. The one or more processors may be further configured to transmit the data and the controller signature to a gateway of the vehicle and receive a gateway signature from the gateway. The gateway signature may be generated based on at least a second portion of the data and transmitted to the controller after the gateway verified the controller signature. In addition, the one or more processors may be configured to verify the gateway signature and process the data.

20 Claims, 12 Drawing Sheets

Related U.S. Application Data

(60) Provisional application No. 62/469,346, filed on Mar. 9, 2017, provisional application No. 62/332,271, filed on May 5, 2016.

(51) Int. Cl.
  *H04L 9/14* (2006.01)
  *H04L 9/08* (2006.01)
  *H04L 29/06* (2006.01)

(52) U.S. Cl.
  CPC .............. *H04L 9/14* (2013.01); *H04L 9/321* (2013.01); *H04L 63/08* (2013.01); *H04L 2209/84* (2013.01)

(56) References Cited

U.S. PATENT DOCUMENTS

| | | |
|---|---|---|
| 6,209,091 B1 | 3/2001 | Sudia et al. |
| 6,263,446 B1 | 7/2001 | Kausik et al. |
| 6,381,331 B1 | 4/2002 | Kato |
| 6,826,690 B1 | 11/2004 | Hind et al. |
| 6,850,951 B1 | 2/2005 | Davison |
| 7,266,695 B2 | 9/2007 | Nakayama |
| 7,320,073 B2 | 1/2008 | Zissimopoulos et al. |
| 7,428,750 B1 | 9/2008 | Dunn et al. |
| 7,522,723 B1 | 4/2009 | Shaik |
| 8,023,647 B2 | 9/2011 | Shaik |
| 8,229,484 B2 | 7/2012 | Anisimov |
| 8,561,187 B1 | 10/2013 | Hegil |
| 8,726,379 B1 | 5/2014 | Stiansen |
| 8,769,304 B2 | 7/2014 | Kirsch |
| 8,819,825 B2 | 8/2014 | Keromytis et al. |
| 9,027,135 B1 | 5/2015 | Aziz |
| 9,094,811 B1 | 7/2015 | Rosen |
| 9,177,005 B2 | 11/2015 | Mehta et al. |
| 9,197,673 B1 | 11/2015 | Gaddy et al. |
| 9,203,819 B2 | 12/2015 | Fenton et al. |
| 9,215,223 B2 | 12/2015 | Kirsch |
| 9,344,413 B2 | 5/2016 | Kirsch |
| 9,356,942 B1 | 5/2016 | Joffe |
| 9,418,222 B1 | 8/2016 | Rivera et al. |
| 9,485,231 B1 | 11/2016 | Reese |
| 9,521,240 B1 | 12/2016 | Rosen |
| 9,674,222 B1 | 6/2017 | Joffe |
| 9,762,458 B2 | 9/2017 | Kim et al. |
| 9,819,556 B2 | 11/2017 | Kim et al. |
| 9,832,217 B2 | 11/2017 | Berger et al. |
| 10,158,539 B2 | 12/2018 | Kim et al. |
| 10,231,268 B2 | 3/2019 | Pathuri et al. |
| 10,244,107 B1 | 3/2019 | Sena |
| 10,314,088 B2 | 6/2019 | Pathuri et al. |
| 10,404,472 B2 | 9/2019 | Knopf |
| 2001/0024502 A1 | 9/2001 | Ohkuma et al. |
| 2002/0076055 A1 | 6/2002 | Filipi-Martin et al. |
| 2002/0194163 A1 | 12/2002 | Hopeman et al. |
| 2003/0065947 A1 | 4/2003 | Song |
| 2003/0110397 A1 | 6/2003 | Supramaniam et al. |
| 2003/0147534 A1 | 8/2003 | Ablay et al. |
| 2003/0177400 A1 | 9/2003 | Raley et al. |
| 2003/0204511 A1 | 10/2003 | Brundage et al. |
| 2004/0062400 A1 | 4/2004 | Sovio et al. |
| 2004/0088587 A1 | 5/2004 | Ramaswamy et al. |
| 2004/0172557 A1 | 9/2004 | Nakae et al. |
| 2004/0176123 A1 | 9/2004 | Chin et al. |
| 2004/0205342 A1 | 10/2004 | Roegner |
| 2005/0010447 A1 | 1/2005 | Miyasaka et al. |
| 2005/0036616 A1 | 2/2005 | Huang et al. |
| 2005/0044402 A1 | 2/2005 | Libin et al. |
| 2005/0054380 A1 | 3/2005 | Michaelis |
| 2005/0097320 A1 | 5/2005 | Golan et al. |
| 2005/0132060 A1 | 6/2005 | Mo et al. |
| 2005/0220080 A1 | 10/2005 | Ronkainen |
| 2005/0220095 A1 | 10/2005 | Narayanan et al. |
| 2006/0059551 A1 | 3/2006 | Borella |
| 2006/0080534 A1 | 4/2006 | Yeap et al. |
| 2006/0083187 A1 | 4/2006 | Dekel |
| 2006/0090166 A1 | 4/2006 | Dhara et al. |
| 2006/0101516 A1 | 5/2006 | Sudaharan |
| 2006/0129817 A1 | 6/2006 | Borneman et al. |
| 2006/0131385 A1 | 6/2006 | Kim |
| 2006/0206709 A1 | 9/2006 | Labrou et al. |
| 2006/0224508 A1 | 10/2006 | Fietz |
| 2006/0236095 A1 | 10/2006 | Smith |
| 2007/0061263 A1 | 3/2007 | Carter et al. |
| 2007/0198437 A1 | 8/2007 | Eisner et al. |
| 2007/0228148 A1 | 10/2007 | Rable |
| 2008/0016232 A1 | 1/2008 | Yared et al. |
| 2008/0028453 A1 | 1/2008 | Nguyen et al. |
| 2008/0028463 A1 | 1/2008 | Dagon |
| 2008/0046987 A1 | 2/2008 | Spector |
| 2008/0089520 A1 | 4/2008 | Kessler |
| 2008/0141313 A1 | 6/2008 | Kato et al. |
| 2008/0163354 A1 | 7/2008 | Ben-Shalom et al. |
| 2008/0189778 A1 | 8/2008 | Rowley |
| 2008/0222711 A1 | 9/2008 | Michaelis |
| 2008/0250248 A1 | 10/2008 | Lieber |
| 2009/0080408 A1 | 3/2009 | Natoli et al. |
| 2009/0089625 A1 | 4/2009 | Kannappan et al. |
| 2009/0119778 A1 | 5/2009 | Bhuyan |
| 2009/0157799 A1 | 6/2009 | Sukumaran et al. |
| 2009/0249014 A1 | 10/2009 | Obereiner |
| 2009/0249497 A1 | 10/2009 | Fitzgerald |
| 2009/0260064 A1 | 10/2009 | McDowell |
| 2010/0003959 A1 | 1/2010 | Coppage |
| 2010/0077457 A1 | 3/2010 | Xu et al. |
| 2010/0100945 A1 | 4/2010 | Ozzie et al. |
| 2010/0100950 A1 | 4/2010 | Roberts |
| 2010/0161969 A1 | 6/2010 | Grebovich et al. |
| 2010/0162396 A1 | 6/2010 | Liu |
| 2010/0174439 A1 | 7/2010 | Petricoin, Jr. et al. |
| 2010/0182283 A1 | 7/2010 | Sip |
| 2010/0185869 A1 | 7/2010 | Moore et al. |
| 2010/0210240 A1 | 8/2010 | Mahaffey et al. |
| 2010/0260337 A1 | 10/2010 | Song et al. |
| 2010/0275009 A1 | 10/2010 | Canard et al. |
| 2010/0306107 A1 | 12/2010 | Nahari |
| 2010/0316217 A1 | 12/2010 | Gammel et al. |
| 2010/0325685 A1 | 12/2010 | Sanbower |
| 2011/0009086 A1 | 1/2011 | Poremba et al. |
| 2011/0067095 A1 | 3/2011 | Leicher et al. |
| 2011/0078439 A1 | 3/2011 | Mao et al. |
| 2011/0103393 A1 | 5/2011 | Meier et al. |
| 2011/0167494 A1 | 7/2011 | Bowen et al. |
| 2011/0179475 A1 | 7/2011 | Foell et al. |
| 2011/0222466 A1 | 9/2011 | Pance |
| 2011/0246765 A1 | 10/2011 | Schibuk |
| 2011/0252459 A1 | 10/2011 | Walsh |
| 2011/0282997 A1 | 11/2011 | Prince |
| 2012/0042381 A1 | 2/2012 | Antonakakis |
| 2012/0050455 A1 | 3/2012 | Santamaria et al. |
| 2012/0124379 A1 | 5/2012 | Teranishi |
| 2012/0155637 A1 | 6/2012 | Lambert et al. |
| 2012/0158725 A1 | 6/2012 | Molloy et al. |
| 2012/0197911 A1 | 8/2012 | Banka et al. |
| 2012/0233685 A1 | 9/2012 | Palanigounder et al. |
| 2012/0265631 A1 | 10/2012 | Cronic et al. |
| 2012/0320912 A1 | 12/2012 | Estrada |
| 2012/0324076 A1 | 12/2012 | Zerr et al. |
| 2012/0324242 A1 | 12/2012 | Kirsch |
| 2012/0331296 A1 | 12/2012 | Levin et al. |
| 2013/0133072 A1 | 5/2013 | Kraitsman et al. |
| 2013/0198078 A1 | 8/2013 | Kirsch |
| 2013/0198516 A1 | 8/2013 | Fenton et al. |
| 2013/0198598 A1 | 8/2013 | Kirsch |
| 2013/0198834 A1 | 8/2013 | Kirsch |
| 2013/0205136 A1 | 8/2013 | Kirsch |
| 2013/0239169 A1 | 9/2013 | Nakhjiri |
| 2013/0246272 A1 | 9/2013 | Kirsch |
| 2013/0246280 A1 | 9/2013 | Kirsch |
| 2014/0198791 A1 | 7/2014 | Lim |
| 2014/0214902 A1 | 7/2014 | Mehta et al. |
| 2014/0344904 A1 | 11/2014 | Venkataramani et al. |
| 2014/0351596 A1 | 11/2014 | Chan |

(56) References Cited

U.S. PATENT DOCUMENTS

| | | |
|---|---|---|
| 2015/0033024 A1 | 1/2015 | Mashima et al. |
| 2015/0047032 A1 | 2/2015 | Hannis et al. |
| 2015/0088754 A1 | 3/2015 | Kirsch |
| 2015/0321557 A1 | 11/2015 | Kim et al. |
| 2015/0326588 A1 | 11/2015 | Vissamsetty |
| 2016/0105344 A1 | 4/2016 | Kim et al. |
| 2016/0105345 A1 | 4/2016 | Kim et al. |
| 2016/0105359 A1 | 4/2016 | Kim et al. |
| 2016/0165651 A1 | 6/2016 | Pathuri et al. |
| 2016/0173505 A1* | 6/2016 | Ichihara ............ H04L 67/12 713/170 |
| 2016/0197932 A1* | 7/2016 | Hoffman ........... H04L 63/102 726/4 |
| 2016/0241509 A1 | 8/2016 | Akcin |
| 2016/0261413 A1 | 9/2016 | Kirsch |
| 2017/0079079 A1 | 3/2017 | Pathuri et al. |
| 2017/0324564 A1 | 11/2017 | Knopf |
| 2017/0339115 A1* | 11/2017 | Cho .................. H04W 12/0609 |
| 2017/0366575 A1 | 12/2017 | Polepalli et al. |
| 2018/0013570 A1 | 1/2018 | Knopf |
| 2018/0013786 A1 | 1/2018 | Knopf |
| 2018/0013824 A1 | 1/2018 | Knopf |
| 2018/0183603 A1* | 6/2018 | Liu .................... H04L 9/3247 |
| 2018/0229739 A1* | 8/2018 | Imamoto ............ H04L 9/0891 |
| 2019/0124199 A1 | 4/2019 | Sena |

OTHER PUBLICATIONS

Balasubramaniam, Sriram et al., "Identity Management and its Impact on Federation in a System-of-Systems Context," Mar. 23-26, 2009, IEEE, pp. 179-182.

Beasley, Jim et al., "VirtualBluetooth Devices as a Means of Extending Pairing and Bonding in a Bluetooth Network," 2002, IEEE, vol. 4, pp. 2087-2089.

Chen, Liqun et al., Multiple Trusted Authorities in Identified Based Cryptography from Pairings on Elliptic Curves, Mar. 19, 2003, HP, pp. 1-26.

Heer, T. et al., "ALPHA: An Adaptive and Lightweight Protocol for Hop-by-Hop Authentication." Proceedings of the 2008 ACM CoNEXT Conference. ACM, 2008.

International Search Report and Written Opinion of PCT/US2012/042743 dated Sep. 18, 2012, 10 pages.

International Search Report and Written Opinion of PCT/US2013/022207 dated Mar. 29, 2013, 11 pages.

International Search Report and Written Opinion of PCT/US2017/31438 dated Jul. 25, 2017, 8 pages.

International Search Report and Written Opinion of PCT/US2018/21877 dated May 30, 2018, 8 pages.

International Search Report and Written Opinion of PCT/US2018/42524 dated Oct. 30, 2018, 8 pages.

International Search Report and Written Opinion of PCT/US2018/42508 dated Dec. 13, 2018, 8 pages.

Jansen, Wayne et al., "Guidelines on Cell Phone and PDA Secuirty," Oct. 2008, NIST, pp. 1-52.

Kholmatov, Alisher et al., "Identity Authentication Using Improved Online Signature Verification Method," Nove. 2005, ScienceDirect, vol. 26, Issue 15, pp. 2400-2408.

Lu, Bin and Pooch, Udo W., "A Lightweight Authentication Protocol for Mobile Ad Hoc Networks." International Conference on Information Technology: Coding and Computing (ITCC'05)—vol. II. vol. 2. IEEE, 2005.

Masmoudi, Khaled et al., "Building Identity-Based Security Associations for Provider-Provisioned Virtual Private Networks," Dec. 2008, Springer, vol. 39, Issue 3, pp. 215-222.

Mayrhofer, Rene et al., "Shake Well Before Use: Intuitive and Secure Pairing of Mobile Devices," Feb. 27, 2009, IEEE, vol. 8, Issue 6, pp. 792-806.

Nguyen, Lan et al., "Secure Authorization, Access Control and Data Integrity in Bluetooth," 2002, IEEE, pp. 428-433.

Novotny, Jason et al., "An Online Credential Repository for the Grid: MyProxy," 2001, IEEE, pp. 104-111.

Poggi, Nicolas et al., "Automatic Detection and Banning of Content Stealing Bots for E-Commerce," NIPS 2007 Workshop on Machine Learning in Adversarial Environments for Computer Security, 2 pages, Dec. 8, 2007.

Request for Comments: 7159. The JavaScript Object Notation (JSON) Data Interchange Format. Mar. 2014.

Sanzgiri, Kimaya et al., "A Secure Routing Protocol for Ad Hoc Networks." 10th IEEE International Conference on Network Protocols, 2002. Proceedings. IEEE, 2002.

So-In, Chakchai et al., "Virtual ID: A Technique for Mobility, MultiHoming, and Location Privacy in Next Generation Wireless Networks," Jan. 9-12, 2010, IEEE, pp. 1-5.

Squicciarini, Anna Cinzia et al., "Access Control Strategies for Virtualized Environments in Grid Computing Systems," Mar. 21-23, 2007, IEEE, pp. 48-54.

Tangswongsan, Supachai et al., "A Model of Network Security with Prevention Capability by Using Decoy Technique," World Academy of Science, Engineering and Technology 29, pp. 184-189, 2007.

* cited by examiner

SYSTEMS AND METHODS FOR ENABLING TRUSTED COMMUNICATIONS BETWEEN CONTROLLERS

CROSS-REFERENCE TO RELATED APPLICATION(S)

This application is a continuation-in-part of U.S. application Ser. No. 15/588,533, filed on May 5, 2017, titled "SYSTEMS AND METHODS FOR ENABLING TRUSTED COMMUNICATIONS BETWEEN ENTITIES," which claims priority to U.S. Provisional Application No. 62/332,271, filed on May 5, 2016, titled "DEVICE AUTHENTICATION USING A CENTRAL REPOSITORY." This application also claims priority to U.S. Provisional Application No. 62/469,346, filed on Mar. 9, 2017, titled "METHODS AND SYSTEMS FOR IDENTITY MANAGEMENT." Further, this application is related to U.S. application Ser. No. 15/652,114 titled "SYSTEMS AND METHODS FOR VERIFYING A ROUTE TAKEN BY A COMMUNICATION," U.S. application Ser. No. 15/652,108, titled "SYSTEMS AND METHODS FOR MITIGATING AND/OR PREVENTING DISTRIBUTED DENIAL-OF-SERVICE ATTACKS," and U.S. application Ser. No. 15/652,089, titled "SYSTEMS AND METHODS FOR DISTRIBUTING PARTIAL DATA TO SUBNETWORKS," which are filed concurrently with this application. The disclosures of the above applications are hereby incorporated by reference in their entirety for all purposes.

TECHNICAL FIELD

The present disclosure relates to computer systems and methods that enable trusted communications between entities. More particularly, the present disclosure relates to computer systems and methods in which a recipient of a communication processes the communication after receiving a confirmation that an entity other than the sender has deemed the communication to be trustworthy.

BACKGROUND

Public-key infrastructure (PKI) enables secure transfer of information between entities without using usernames, passwords, or shared secrets. However, a PKI deployment requires certificate authorities (CAs) and validation authorities (VAs), which are single points of failure. Therefore, if a CA or VA becomes disabled or compromised, every entity that relies on the CA or the VA may no longer be able to communicate securely with other entities. Further, these entities may become more vulnerable to attacks, such as spoofing, after the CA or VA is compromised or disabled.

Moreover, in a conventional PKI deployment, managing digital certificates becomes increasingly complex process as the number of entities in deployment escalates. For deployments that include tens or even hundreds of millions of entities (e.g., internet of things), the management of digital certificates may be prohibitively complex.

SUMMARY

Computer systems and methods that enable trusted communications between entities are disclosed. More particularly, computer systems and methods in which a recipient of a communication processes the communication after receiving a confirmation that an entity other than the sender has deemed the communication to be trustworthy are disclosed.

In one embodiment, a controller of a vehicle may include one or more processors configured to receive data and a controller signature from a second controller. The controller signature may be generated based on at least a first portion of the data. The one or more processors may be further configured to transmit the data and the controller signature to a gateway of the vehicle and receive a gateway signature from the gateway. The gateway signature may be generated based on at least a second portion of the data and transmitted to the controller after the gateway verified the controller signature. Further, the one or more processors are configured to verify the gateway signature and process the data.

In another embodiment, a method for communicating with a second controller of a vehicle may include receiving data and a controller signature from the second controller. The controller signature may be generated based on at least a first portion of the data. The method may further include transmitting the data and the controller signature to a gateway of the vehicle and receiving a gateway signature from the gateway. The gateway signature may be generated based on at least a second portion of the data and transmitted to the controller after the gateway verified the controller signature. Further, the method may include verifying the gateway signature and processing the data.

In yet another embodiment, a non-transitory computer-readable storage medium storing instructions that when executed by a computer may cause the computer to perform a method for communicating with a second controller of a vehicle. The method may include receiving data and a controller signature from the second controller. The controller signature may be generated based on at least a first portion of the data. The method may further include transmitting the data and the controller signature to a gateway of the vehicle and receiving a gateway signature from the gateway. The gateway signature may be generated based on at least a second portion of the data and transmitted to the controller after the gateway verified the controller signature. Further, the method may include verifying the gateway signature and processing the data.

BRIEF DESCRIPTION OF THE DRAWINGS

Further features of the invention, its nature and various advantages, will be apparent upon consideration of the following detailed description taken in conjunction with the accompanying drawings, in which the same reference numbers or letters refer to the same elements throughout.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as interconnected machine modules within the computing system and/or (2) as a sequence of computer implemented steps running on a computing system. The implementation is a matter of choice dependent on the performance requirements of the computing system implementing the invention. Accordingly, the logical operations making up the embodiments described herein are referred to alternatively as operations, steps or modules.

Aspects of the disclosure pertains to computer systems and methods that enable trusted communications between two entities. More particularly, the present disclosure relates to computer systems and methods where a recipient of a communication may process the communication after receiving a confirmation that an entity other than the sender has deemed the communication to be trustworthy. Further, the disclosed systems and methods may be capable of controlling an entity's ability to communicate with other entities in real time. In embodiments that leverage public-key cryptography, the disclosed systems and methods may be capable of remotely adding, removing, revoking, or replacing one or more digital keys stored on, or accessible by, various entities. There are several potential applications for this technology, and the scope of this disclosure is not intended to be limited to any particular business concern.

Figure 1:
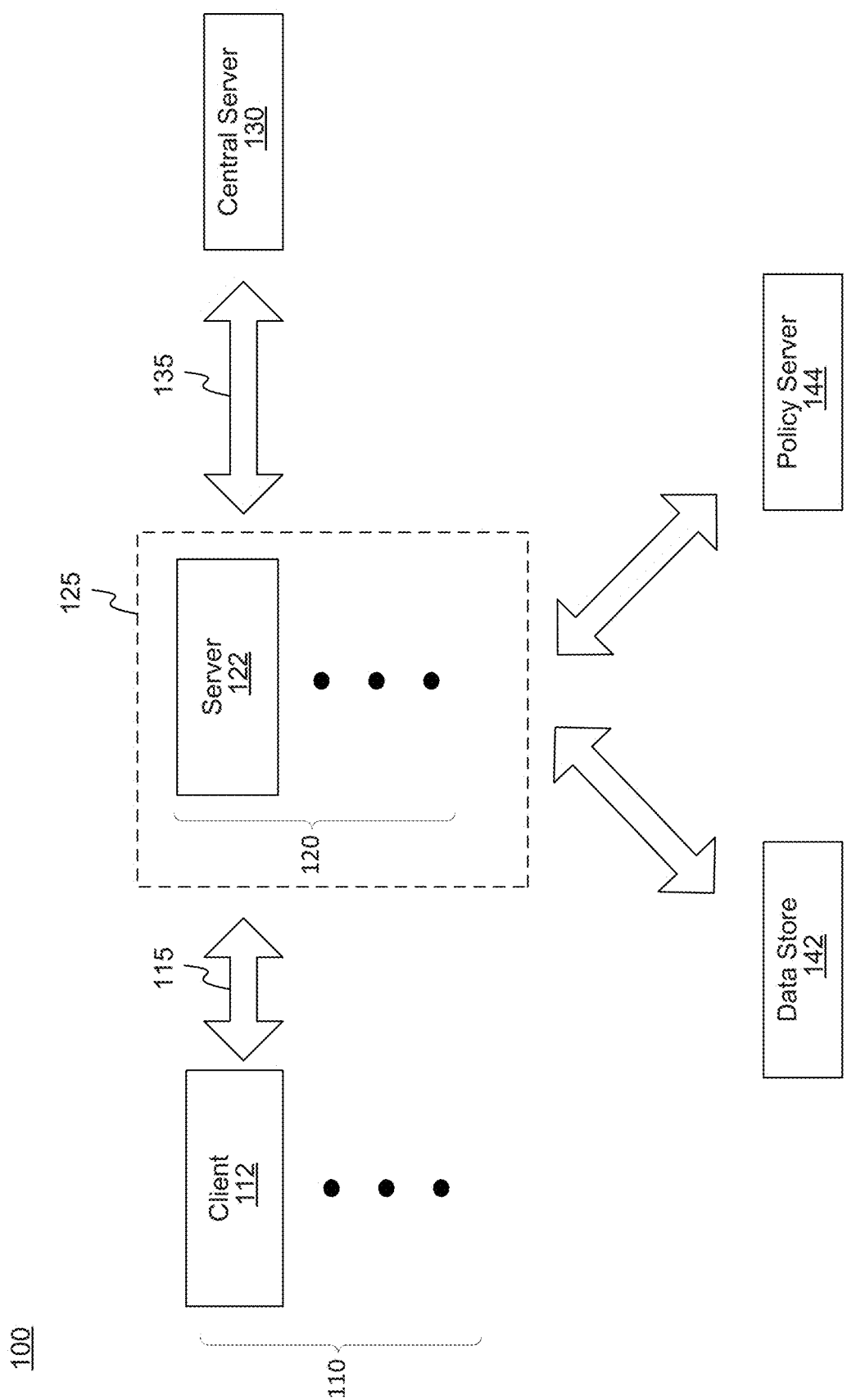
FIG. 1 illustrates an example of a system in accordance with embodiments of the present invention.

FIG. 1 illustrates an example of a system 100 in which concepts consistent with the principles of the invention may be implemented. System 100 includes one or more clients 110 that are associated with at least one server group 125. A server group 125 is a logical grouping of one or more servers 120. System 100 further includes at least one central server 130 associated with server group 125. Clients 110, servers 120 in server group 125, and central server 130 may be collectively referred to as a "project." Clients 110 can connect to servers 120 in the associated server group 125 via network 115. Servers 120 in server group 125 can connect to central server 130 via network 135. Network 115 and/or network 135 may be or include, along or in conjunction, an intranet, the Internet, a local-area network (LAN), a wide-area network (WAN), or others. In system 100, clients 110 are shown to be associated with a single server group 125. However, in some embodiments, one or more clients 110 may be associated with, and can connect to, a plurality of server groups. Further in system 100, central server 130 is shown to be associated with a single server group 125. However, in some embodiments, central server 130 may be associated with a plurality of server groups, and/or a single server group 125 may be associated with a plurality of central servers.

Various resources may be shared among servers 120 in server group 125. In system 100 of FIG. 1, for example, each server 122 may access a common data store 142 and a policy server 144. Data store 142 may be, for example, a hardware security module (HSM), a database server, or a network-attached storage (NAS). Data store 142 may store, for example, digital keys that needs to be shared among servers 120. A policy server 144 may include information relating to system 100's policy. For example, policy server 144 may include information that can be used to determine which entities are authorized to communicate with other entities in system 100. In another example, policy server 144 may include information that can be used to determine whether one or more entities are currently active, deactivated, or removed in system 100. In FIG. 1, the shared resources are shown to be shared among servers 120 in a single server group 125; however, in some embodiments, the shared resources may be shared among servers across a plurality of server groups. Additionally, or alternatively, the resources may be further shared with one or more clients 110 and/or central server 130.

An entity (e.g., client 112, server 122, or central server 130) may be implemented on one or more physical or virtual machines having, or having access to, a processor, memory, and a storage device. Alternatively, or additionally, an entity may be implemented on a cloud platform, such as, but not limited to, Amazon Web Services (AWS), Google Cloud Platform, and Microsoft Azure. In some embodiments, a set of physical and/or virtual machines may implement two or more of clients 110, servers 120, and central server 130. In some embodiments, server 122, and/or central server 130 may be implemented on one or more gateways.

At least some of the communications between a client 112 and server 122 may be communicated as trusted communications that have been deemed trustworthy by at least one entity other than the client 112 and the server 122, such as central server 130. For example, upon receiving a communication from client 112, server 122 may forward the communication to central server 130 and receive a confirmation that central server 130 has deemed the communication to be trustworthy. In this example, server 122 may process (or finish processing) the communication after receiving the confirmation. In another example, upon receiving a communication from server 122, client 112 may process (or finish processing) the communication after confirming that central server 130 has deemed the received communication to be trustworthy.

These confirmations that central server 130 has deemed the communication trustworthy may add additional layers of security to system 100 that make the system more difficult for attackers to breach. For example, compared to conventional systems, attackers may need to gain access to more entities and/or coordinate a more complex attack to breach system 100.

In some embodiments, all communications between client 112 and server 122 may be communicated as trusted communications. Alternatively, a subset of the communications between client 112 and server 122 may be communicated as trusted communications. In some embodiments, communications that include a predetermined type(s) of data (e.g., sensitive information) may be communicated as trusted communications. For example, communications to clients 110 that include firmware updates may be communicated as trusted communication.

In some embodiments, at least some of the communications between client 112 and server 122 may be trusted communications that have been independently deemed to be trustworthy by a plurality of central servers. In some embodiments, at least some of the communications between client 112 and server 122 may be trusted communications that have been independently deemed trustworthy by central server 130 and at least one other entity (e.g., another server). In some embodiments, at least some of the communications between client 112 and server 122 may be trusted communications that have been independently deemed trustworthy by central server 130 and the recipient of the communications.

Central server 130 may deem that a communication is trustworthy after verifying that at least a portion of information included in the communication is correct. For example, central server 130 may verify that the sender identified in the communication is indeed the sender of the communication. In some embodiments, central server 130 may deem that a communication is trustworthy based on a policy associated with system 100. For example, central server 130 may verify, by accessing a policy server (e.g., policy server 144 or another policy server), that the sender of the communication is authorized to send a communication and/or that the recipient is authorized to receive a communication from the sender. In some embodiments, central server 130 may deem that a communication is trustworthy after inspecting the content of the communication. For example, central server 130 may verify that the communication does not include any known malicious software code or instructions. In another example where the communication includes a firmware and a checksum for the firmware, central server 130 may verify that the checksum for the firmware is correct. Moreover, central server 130 may deem that a communication is trustworthy after verifying that the sender and/or the recipient of the communication is not included in one or more blacklists. The blacklists may include server-group-wide blacklists, system-wide blacklists, and/or global blacklists.

Furthermore, central server 130 may deem that a communication is trustworthy after verifying that the sender and/or the recipient of the communication is an active entity in system 100. For example, central server 130 may access a list identifying active entities to determine whether the sender and/or the recipient is an active entity. If client 112 and/or server 122 has been deactivated (i.e., identified in the list as being inactive) or removed from system 100 (i.e., missing from the list), central server 130 may not provide a confirmation to the recipient that the communication is trustworthy. Therefore, by simply listing client 112 or server 122 as being inactive or removing client 112 or server 122 from the list, client 112 or server 122 may be immediately prevented from communicating with other entities in system 100. This capability of system 100 may be useful, for example, when a client 112 or server 122 is compromised, to be retired, or temporarily/permanently removed from system 100.

In embodiments where the communication is forwarded to one or more entities other than central server 130 to be independently determined as being trustworthy, such entities may perform the same process or a different process as central server 130 before determining that the communication is trustworthy.

In some embodiments, a client 112 may directly connect to a specific server 122 in server group 125. For example, client 112 may connect to a specific server 122 using an IP address or an identifier that is unique to the server 122. In other embodiments, a gateway may be associated with server group 125, and the gateway may dynamically assign one of servers 120 in server group 125 to receive and/or process the communication from client 112. For example, client 112, prior to sending a communication, may request an IP address or an identifier of an assigned server 122 from the gateway. Alternatively, or additionally, client 112 may transmit the communication to the gateway, and the gateway may forward the communication to a server 122. The gateway may assign a server 122 based on variety of factors, including, but not limited to, the amount of resources available to servers 120, network distance/cost between client 112 and servers 120, whether a server 120 handled prior communications from client 112, and whether a server 120 has access to the required resources. In some embodiments, client 112 may transmit a communication to a server in server group 125, but receive a response from another server in server group 125. Client 112 may or may not have access to the identity of server 122 that received the communication.

IoT Deployments

Figure 2:
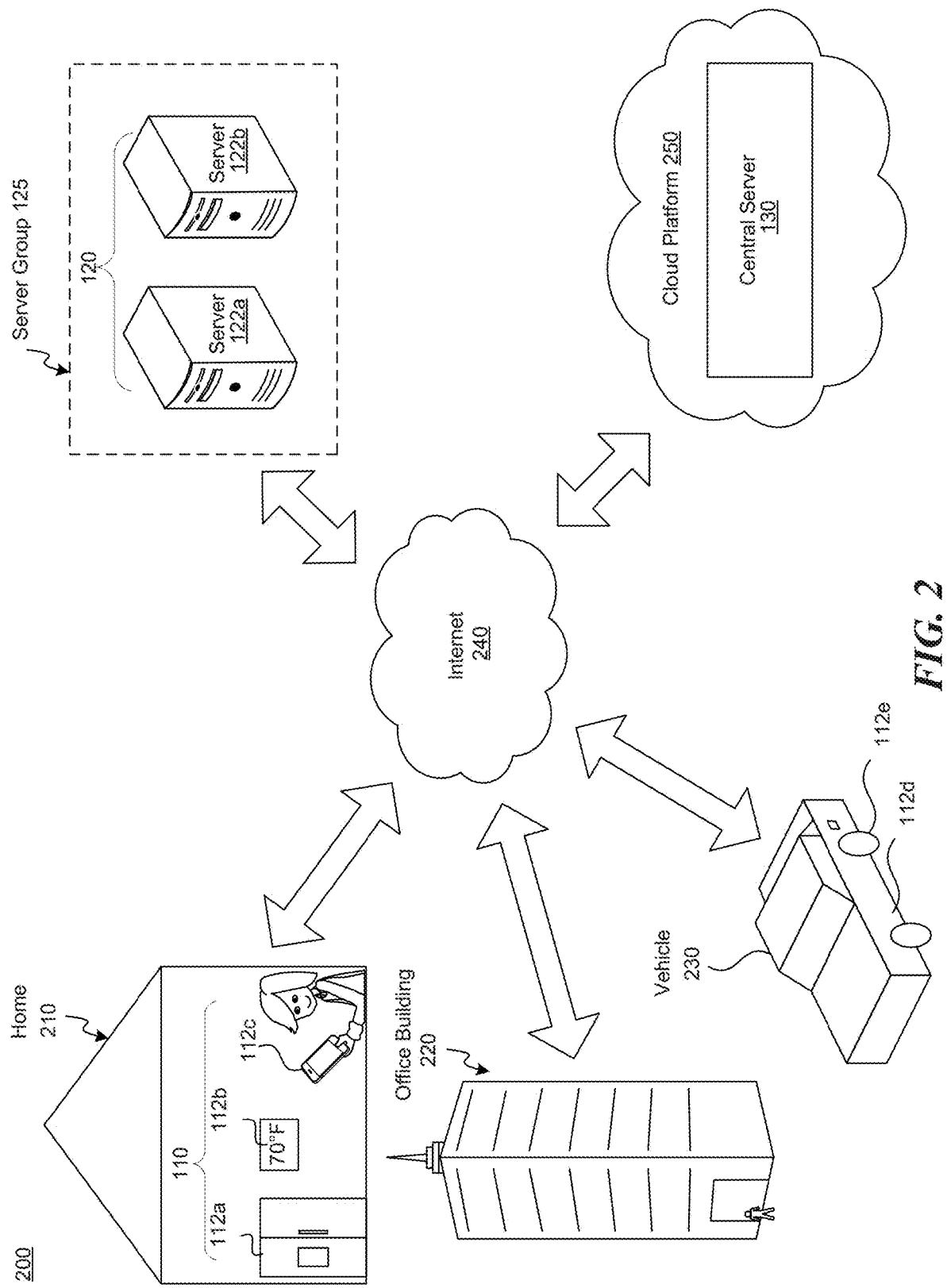
FIG. 2 illustrates another example of a system in accordance with embodiments of the present invention.

FIG. 2 illustrates an example of a system 200 in which additional concepts consistent with the principles of the invention may be implemented. System 200 is similar to system 100 of FIG. 1, except that system 200 illustrates various types of internet-of-things (IoT) clients (or devices) 110 that can be deployed in various environments, such as a home 210, office building 220, and vehicle 230. For example, in home 210 of FIG. 2, clients 110 such as a smart appliance (e.g., refrigerator) 112a, smart thermostat 112b, and a portable electronic device 112c are deployed. Office building 220 may include clients 110 such as a door/gate control device, a coffee machine, and a parking spot sensor (not shown). In vehicle 230, clients 110 such as an entertainment device 112d, a smart tire-pressure sensor 112e, or a vehicle diagnostic system (not shown) may be deployed.

In FIG. 2, servers 120 in server group 125 and central server 130 are shown to be physically located away from clients 110 that are deployed in home 210, office building 220, and vehicle 230. Therefore, clients 110 may connect to servers 120 via the Internet 240, as shown, or via a private wide-area network (WAN). However, in some embodiments, one or more of servers 120 in server group 125 and/or central server 130 may be located nearby clients 110 and connected to each other via a local-area network (LAN), such as a W-Fi network. In these embodiments, servers 120 and/or central server 130 may be located in a secure area. For example, servers 120 and/or central server 130 may be located in an area of Office Building 220 that is not accessible to public. As shown in FIG. 2, central server 130 may be deployed on a cloud platform as a service.

In FIG. 2, servers 120 and central server 130 are shown to be communicating via the Internet. In some embodiments, however, servers 120 and central server 130 may communicate via a private network. In some embodiments, servers 120 and central server 130 may be implemented on the same cloud platform.

In system 200, clients 110 are shown to be implemented on devices/components that are interfacing with, or operating near, a user. In some embodiments, servers 120 may be implemented on a device or component that interfaces with, and/or or operates near, a user. One of ordinary skill in the art will appreciate that whether a device/component is functioning as a server or a client often depends on the specific application being implemented and the client-server relationship.

In some embodiments, central server 130 may be implemented to provide Identity as a Service (IDaaS) providing authentication and/or verification of device, server, and user identities in Internet-of-Things (IoT) applications. In addition, various interfaces (e.g., management portal and/or command-line interface) may be provided to identify breaches in system 200 and/or provide complete management of identities in IoT systems (e.g., provisioning, revocation, etc.).

In some embodiments, central server 130 and/or servers 120 may be implemented on one or more public cloud platforms that can be accessible over the Internet. Alternatively, there may be instances where the administrator wants to have direct control over central server 130 and/or servers 120. In these embodiments, one or more of central server 130 and/or servers 120 may be implemented on a private cloud platform that may not be accessible by entities outside a private network that the private cloud platform is a part of.

For locations with no or limited connectivity, central server 130 and/or servers 120 may be implemented on a local network. For example, for a system used in an oil rig that is offshore with unstable network/Internet connections, central server 130 and server 122 may be implemented on one or more physical host deployed in a local network of the oil rig.

In instances where a low latency communication is needed, central server 130 and/or servers 120 may be implemented on gateways or servers that are close to the network edge while still having access to a cloud platform. In fog deployments where the cloud platform can extend into a private network, central server 130 and/or server 120 may be positioned in a network location to meet the latency requirements. A low latency may be needed, for example, for a system deployed in a "smart city." An end point client such as a signal light in the "smart city" may need to respond very quickly to communications sent from various entities in the system. In some embodiments, central server 130 and/or server 122 may be implemented on a cloud platform, which may be replicated in part or in entirety to one or more physical hosts deployed on a local network with clients 110.

Figure 3:
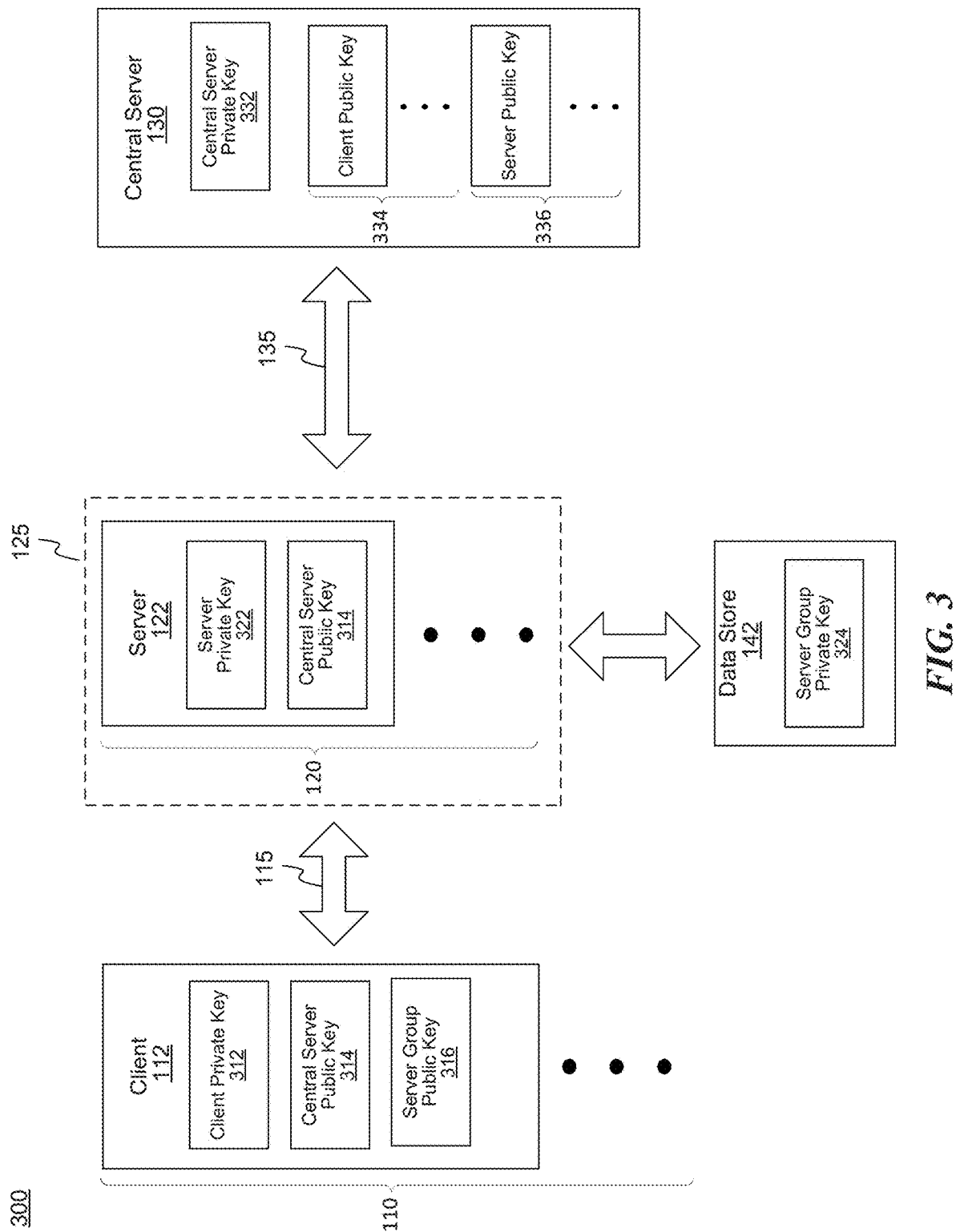
FIG. 3 illustrates yet another example of a system in accordance with embodiments of the present invention.

FIG. 3 illustrates an example of a system 300 which is similar to system 100 of FIG. 1, except that system 300 leverages public-key cryptography to enable trusted communications between clients 110 and servers 120.

In system 300, public/private key pairs are generated for each entity using a public-key cryptography algorithm, such as an RSA. The generated private key is typically kept within the entity that generated the key pair, but the public key may be distributed throughout system 300 so that various entities may access them. FIG. 3 illustrates private and public keys that can be accessed by various entities in system 300.

While public/private key pairs have many different uses, in system 300, a private key may be used to generate a digital signature based on given data (i.e., to "sign the data"), and a corresponding public key (i.e., a public key that was generated with the private key using the public-key cryptography algorithm) may be used to verify that the generated digital signature is indeed generated by an entity that has access to the corresponding private key. Additionally, the corresponding public key may be used to further verify that the data has not been altered since the digital signature was generated.

A digital signature may be generated in numerous ways. In one example, a digital signature may be generated by encrypting a hash value of given data using a private key. In this example, a corresponding public key may be used to decrypt the digital signature and obtain the hash value of the original data. Thus, if the decrypted digital signature matches the hash value of the received data, it may prove that 1) the data was signed with a private key that corresponds to the public key, and 2) the data has not changed since it was signed. However, if the decrypted digital signature does not match the hash value of the received data, the data has been altered and/or the digital signature was created with a private key that does not correspond to the public key. In some embodiments, a digital signature may be generated by encrypting metadata (e.g., checksum) of given data using a private key.

In another example, a digital signature may also be generated by encrypting a portion or all of the given data using a private key. Here, a corresponding public key may be used to decrypt the digital signature to obtain the portion of, the data or the entire data. Subsequently, the decrypted digital signature may be compared to the received data to determine (1) that the data was signed with a private key that corresponds to the public key, and (2) that the data has not changed since it was signed. It may be advantageous in terms of performance, however, to generate a digital signature based on a hash value rather than a portion or all of the given data because the size of a hash value is typically smaller than the size of the data.

In system 300 of FIG. 3, each client 112 has access to its own private key 312, a central server 130's public key 314, and server group 125's public key 316. While client 112 is shown to store these keys within client 112 in FIG. 3, in some embodiments, client 112 may store at least some of the keys in a storage component separate from client 112. For example, at least some of these keys may be stored in an HSM. In some embodiments, client 112 may not have direct access to at least some of the keys. Instead, client 112 may request a separate signature processor to generate and/or verify digital signatures using the keys that are accessible by the signature processor. For example, client 112 may send data to a signature processor, and the signature processor may return a signature that is generated using the private key associated with client 112. In another example, client 112 may send data and a digital signature to a signature processor, and the signature processor may return a confirmation that the digital signature has been verified using one of the public keys accessible by the signature processor. A different signature processor may be used by each client 112 in system 300. Alternatively, a signature processor may be shared by a plurality of clients 110. In some embodiments, a signature processor may be a secure element or trusted platform module (TPM). For example, the signature processor may be a tamper-resistant chip integrated that may be used for secure data storage or running a trusted execution environment (TEE).

In some embodiments, client 112's private key 312 and its corresponding public may be associated with software or hardware of client 112. For example, private key 312 may be associated with the physical computer, the operating system, or the client software implementing client 112's function. In these embodiments, private key 312 and its corresponding public key may be referred to as "device keys." Device keys may be used to generate and verify digital signatures (i.e., asserting and verifying device's identity).

In some embodiments, client 112's private key 312 and its corresponding public may be associated with a user that is currently using client 112. In these embodiments, private key 312 and its corresponding public key may be referred to as "user keys." User keys may be used to generate and verify digital signatures (i.e., asserting and verifying user's identity).

In some embodiments, client 112 may have access to a plurality of private keys. In some embodiments, the plurality of private keys may include a device private key and a user private key.

Further in system 300, each server 122 in server group 125 may have access to its own private key 322, central server 130's public key 314, and server group 125's private key 324. In some embodiments, each server 122 in server group 125 may further have access to public keys 334 of clients 110. In FIG. 2, these keys are shown to be stored within server 122. However, in some embodiments, at least some of these keys may be stored in a storage component separate from server 122. For example, at least some of these keys may be stored in data store 142. Alternatively, or additionally, server 122 may not have direct access to at least some of the keys. Instead, server 122 may request a separate signature processor to generate or verify digital signatures using some of the keys that are stored in the signature processor. A separate signature processor may be used by each server 122. Alternatively, a signature processor may be shared by a plurality of servers 120.

As shown in FIG. 3, each server 122 also has access to server group 125's private key 324, which is shown to be stored in data store 142. However, in some embodiments, each server 122 may have a local copy of server group 125's private key 324. In some embodiments, servers 120' access to server group's private key 324 may be limited. For example, server 122's access to private key 324 may be based on policies associated with system 300. Policies may define, for example, a time period and frequency that a server 122 can access private key 324. In another example, server 122's access to private key 324 may be granted after verifying that server 122 is indeed associated with server group 125. In yet another example, server 122's access to server group 125's private key 324 may be granted after verifying that server 122 is an active server in system 300 and/or that server 122 is not listed in any blacklist. Alternatively, or additionally, server 122 may not have direct access to private key 324. Instead, server 122 may request a separate signature processor to generate or verify digital signatures using keys that are accessible by the signature processor.

Central server 130 may have access to its own private key 332, public keys 334 of clients 110, and public keys 336 of servers 120. In FIG. 3, the keys are shown to be stored within central server 130. However, in some embodiments, at least some of these keys may be stored in a storage component separate from central server 130. In some embodiments, at least some of the keys stored in the storage component may be shared with one or more of clients 110 and servers 120. Alternatively, or additionally, central server 130 may not have direct access to at least some of the keys. Instead, central server 130 may request a separate signature processor to generate or verify digital signatures using some of the keys that are stored in the signature processor.

In embodiments where each client 112 has a plurality of private keys, public keys 334 of clients 110 may include public keys corresponding to each client 112's plurality of private keys.

As shown in FIG. 3, central server 130 is shown to have access to public keys 334 of all clients and public keys 336 of all servers in system 300. However, in some embodiments, system 300 may include a plurality of central servers, each central server having access to public keys of a subset of clients 110 and servers 120.

As discussed above, clients 120, servers 120 in server group 125, and central server 130 may be collectively referred to as a "project." Further, server group 125's private key 324 and public key 316 may also be referred to as a project private key and a project public key, respectively.

End-to-End Trust for Connected Devices

Figure 4:
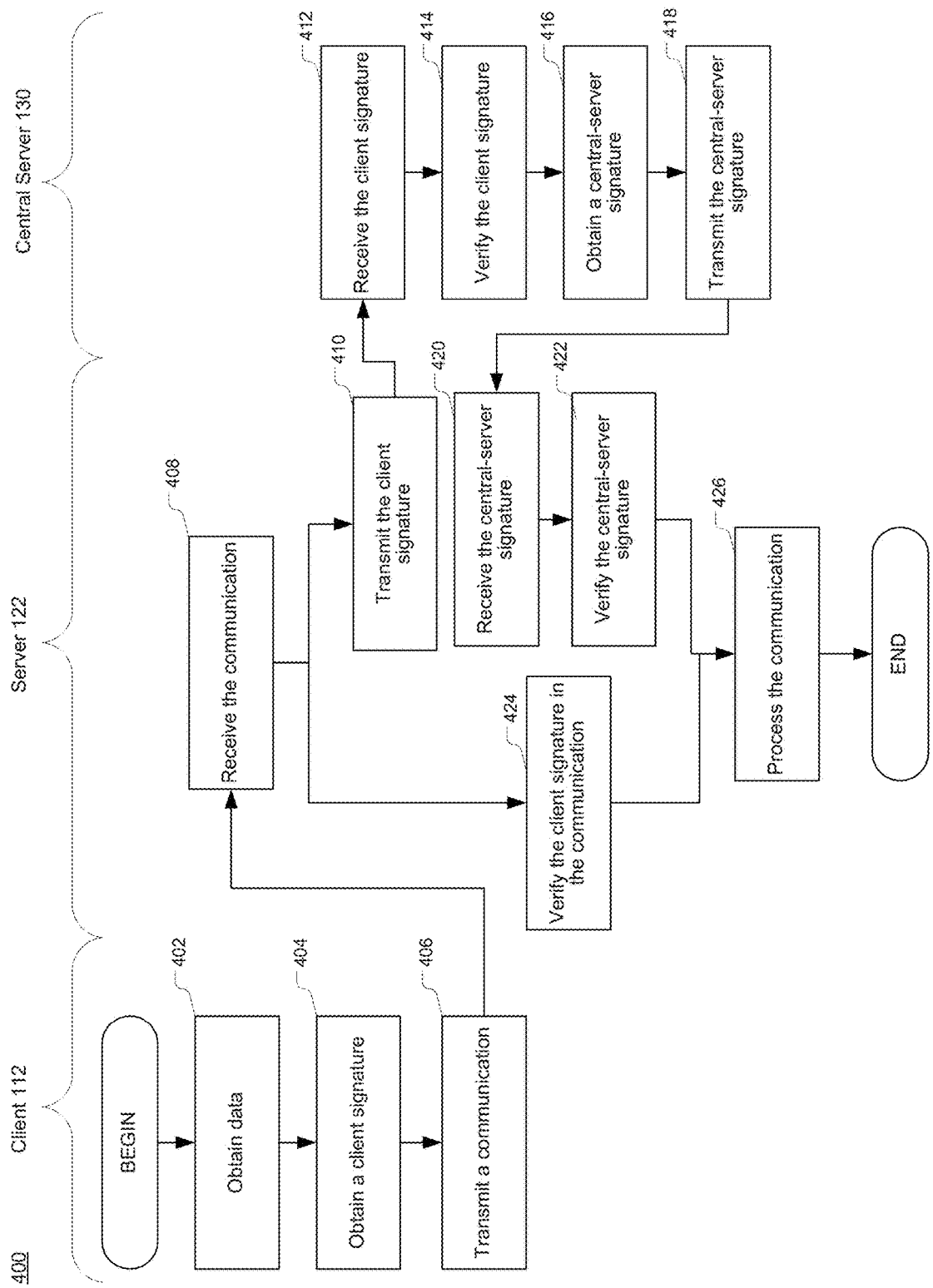
FIG. 4 is a flow diagram of a process for sending a trusted communication from a client to a server in accordance with embodiments of the present invention.

FIG. 4 is a flow diagram of an example process 400 for sending a trusted communication from a client 112 to a server 122 in which concepts consistent with the principles of the invention may be implemented. As shown in FIG. 4, steps 402, 404, and 406 may be implemented by client 112; steps 408, 410, 420, 422, 424, and 426 by server 122; and steps 414, 414, 416, and 418 by central server 130. However, in some embodiments, steps 402, 404, and 406 may be implemented by server 122 and steps 408, 410, 420, 422, 424, and 426 may be implemented by client 112. In some embodiments, steps 402, 404, and 406 may be implemented by client 112 and steps 408, 410, 420, 422, 424, and 426 may be implemented by another client. In some embodiments, steps 402, 404, and 406 may be implemented by server 122 and steps 408, 410, 420, 422, 424, and 426 may be implemented by another server.

At a step 402, client 112 may obtain data to be sent to server 122. In some embodiments, the data may be generated by client 112. Alternatively, or additionally, client 112 may retrieve or receive the data that was obtained or generated by one or more devices or components that are associated with, and/or connected to, client 112. For example, client 112 may retrieve or receive sensor data from a sensor component connected to client 112.

The data may be any data that client 112 can access. For example, in system 200 of FIG. 2, smart refrigerator 112*a* may obtain data that includes a current temperature inside the refrigerator and/or the number of times the door has been opened per hour. Smart thermostat 112*b* may obtain data that includes, for example, the current room temperature and/or the configuration data, such as a heating/AC schedule. In another example, tire pressure sensor 112*e* may obtain data that includes raw sensor data.

In some embodiments, the data may be provided by a user. For example, a user may provide data directly to client 112 via a user interface connected to client 112. Alternatively, or additionally, a user may provide data indirectly to client 112, for example, by causing the data to be transmitted to client 112 or by causing client 112 to retrieve the user-generated data from another entity.

In some embodiments, the data may include information identifying the sender (i.e., client 112) and/or the intended recipient(s). In some embodiments, the data may include a set of data. Further, the set of data may include data obtained from a plurality of sources or generated by a plurality of entities.

In some embodiments, the obtained data may be encrypted. For example, the obtained data may be encrypted using Elliptic Curve Diffie-Hellman (ECDH) algorithm, and only intended recipient or a plurality of recipients may decrypt the data.

In some embodiments, the obtained data may include expiration date/time associated with the data and/or unique nonce data.

At a step 404, client 112 may obtain a client signature. In some embodiments, the client signature may be generated based on at least a portion of the obtained data using client 112's private key 312. For example, client 112 may generate the client signature by generating a hash value of the obtained data and encrypting the generated hash with client 112's private key 312. In some embodiments, client 112 may generate the client signature by encrypting a portion or all of the data to be sent to server 120 using client 112's private key 312.

A client signature may be a digital signature generated using client 112's private key 312. However, in some embodiments, the client signature may be any information that can be used by servers 120 and/or central server 130 to verify that the data is indeed sent by client 112 and/or that the data has not been altered after the data was transmitted by client 112. For example, the client signature may be a passcode associated with client 112. A digital signature, however, is preferable over the passcode as the passcode may be compromised, for example, when the data is intercepted. In another example, the client signature may be a hash value of the obtained data. The digital signature may be generated by client 112. Alternatively, client 112 may obtain the digital signature from another component such as a signature processor.

In embodiments where client 112 has access to a plurality of private keys, client 112 may generate a client signature based on the plurality of private keys. Alternatively, client 112 may generate a plurality of client signatures based on the plurality of private keys.

At a step 406, client 112 may transmit a communication. The communication may be destined for server 122. Further, the communication may include the generated client signature and/or the obtained data. In embodiments where the client signature is an encrypted version of the entire data, the communication may include the generated client signature without the data. As discussed above in reference to FIG. 1, the communication may be transmitted directly to a specific server 122, for example, by using a identifier or an electronic address (e.g., IP address) associated with server 122. Alternatively, also as discussed above, the communication may be sent to a gateway associated with server group 125, and the gateway may forward the communication to one of the servers 120 in server group 120. In some embodiments, the communication may include additional data other than the obtained data and the generated client signature. For example, the communication may include, in addition to the obtained data and the generated client signature, identification of the algorithm used to generate the client signature.

In embodiments where client 112 generated a plurality of client signatures, the communication may include the plurality of client signatures.

At a step 408, server 122 may receive the communication.

At a step 410, server 122 may transmit the client signature to central server 130. In some embodiments, server 122 may further transmit the data to central server 130. In some embodiments, server 122 may transmit the entire communication that was received from client 112 to central server 130.

In some embodiments, server 122 may further transmit the client signature, the data, and/or the remaining portion of the communication to at least one other server and/or at least one other central server.

At a step 412, central server 130 may receive the client signature. In some embodiments, central server 130 may further receive the data. In some embodiments, server 112 may receive the entire communication that server 122 received form client 112.

At a step 414, central server 130 may verify the client signature. In some embodiments, central server 130 may verify the client signature by generating a hash value of the received data, decrypting the client signature using client 112's public key 334, and comparing the decrypted signature with the generated hash value of the received data. A match between the decrypted client signature and the generated hash value of the received data may indicate to central server 130 that 1) the sender of the data had access to client 112's private key 312, and 2) the data has not been altered since the data was signed by the sender. If only client 112 is assumed to have access to client 112's private key 312, the match may further indicate to central server 130 that client 112 is indeed the sender of the data. If the decrypted client signature and the generated hash value of the received data do not match, central server 130 may halt process 400. That is, the communication may "die on the vine." In some embodiments, if the decrypted client signature and the generated hash value of the received data do not match, central sever 130 may notify server 122 that the communication from client 112 is not deemed trustworthy. Alternatively, central server 130 may not notify server 122. In some embodiments, central server 130 may save the client signature and/or the data for further examination, for example, by a system administrator or a security analysis software.

In embodiments where the client signature is an encrypted version of a portion or the entire data, central server 130 may verify the client signature by decrypting the client signature using client 112's public key 334 and comparing the decrypted client signature with a portion or all of the received data.

In embodiments where a plurality of client signatures is received, central server 130 may verify at least one client signature. In some embodiments, central server 130 may verify all of the plurality of client signatures.

At a step 416, central server 130 may obtain a central-server signature generated based on at least a portion of the data using central server 130's private key 332. For example, the central-server signature may be generated by generating a hash value of the data and encrypting the hash value with central server 130's private key 332. In some embodiments, central server 130 may generate a central-server signature based on both the data and the client signature. In embodiments where the entire communication was transmitted to central server 130, central server 130 may generate a central-server signature based the entire communication. In embodiments where the client signature is an encrypted version of a portion or the entire data, the central-server signature may be generated based on a portion or all of the decrypted client signature.

In system 300, a central-server signature is a digital signature generated using central server 130's private key 332. However, in some embodiments, the central-server signature may be any information that can be used by servers 120 and clients 110 to confirm that central server 130 has deemed the communication as being trustworthy. For example, the central-server signature may be a passcode associated with central server 130. In some embodiments, the central-server signature may simply be an identifier of central server 130. A digital signature, however, is preferable over a passcode or an identifier because the passcode and identifier may be compromised or already known by public.

In some embodiments, central server 130 may log that the central-server signature has been generated. The log may include at least a portion of the data and/or the client signature.

At a step 418, central server 130 may transmit the central-server signature to server 122. In some embodiments, central server 130 may further transmit the data and/or the client signature. In some embodiments, central server 130 may further transmit the entire communication sent by client 112.

In some embodiments, central server 130 may transmit the central-server signature after determining that the received data is in accordance with policies associated with system 300. For example, central server 130 may verify, by accessing a policy server (e.g., policy server 344), that client 112 is authorized to send a communication to server 122 and/or that server 122 is authorized to receive a communication from client 130. A policy may also define, for example, a time period and frequency at which client 112 and server 122 may communicate. If central server 130 determines that the received data is not in accordance with the policies associated with system 300, central server 130 may halt process 400 and/or notify server 122.

In some embodiments, central server 130 may transmit the central-server signature after inspecting the content of the communication or the received data. For example, central server 130 may verify that the communication does not include any known malicious software code or instructions. If malicious software code or instructions are detected, central server 130 may halt process 400 and/or notify server 122.

In some embodiments, central server 130 may have access to a list of active entities in system 300 and may transmit the central-server signature after verifying that client 112 and/or server 122 is listed as being active. If one or both of client 112 and server 122 are listed as being inactive or missing from the list, central server 130 may halt process 400 and/or notify server 122. Therefore, in these embodiments, by simply listing client 112 or server 122 as being inactive or removing client 112 or server 122 from the list, client 112 or server 122 may be immediately prevented from communicating with other entities. In some embodiments, a user, an administrator, and/or an owner of a system (or a project) may use a management portal to manipulate the list of active entities and immediately prevent an entity from communicating.

In embodiments where server 122 transmitted the client signature, the data, and/or the remaining portion of the communication to at least one server other than 122, each server that receives the client signature, the data, and/or the remaining portion of the communication may verify the receive client signature. In some embodiments, each server may verify the client signature using its own copy of client 112's public key. Further, each server may transmit a digital signature generated using each server's private key to central server 130. In these embodiments, central server 130 may transmit the central-server signature after verifying each of the digital signature received.

At a step 420, server 122 may receive the central-server signature. In some embodiments, server 122 may further receive the data and/or the client signature. In some embodiments, central server 130 may further receive the entire communication. In embodiments where server 122 transmitted the client signature, the data, and/or the remaining portion of the communication to at least one central server other than central server 130, server 122 may receive additional central-server signatures from the other central server(s).

At a step 422, server 122 may verify the central-server signature. Server 122 may verify the central-server signature, for example, using central server 130's public key 314. In one example, server 122 may verify the central-server signature by generating a hash value of the received data, decrypting the central-server signature using central server 130's public key 314, and comparing the decrypted signature with the generated hash value of the received data. A match between the decrypted central-server signature and the generated hash value of the data is a confirmation to server 122 that central server 130 has deemed the communication from client 112 to be trustworthy. More particularly, the match is a confirmation to server 122 that central server 130 has verified that 1) client 112 is indeed the sender of the communication, and 2) the data has not been altered since the data was signed by client 112.

At an optional step 424, server 122 may verify the client signature using client 112's public key, which may be stored locally at server 122 or retrieved from a separate data store (e.g., data store 142). It may be preferable that server 122's source of client 112's public key is different from central server 130's source of client 112's public key so as to avoid a single point of failure (e.g., when the source is compromised to an attack). In system 300, for example, server 122 may verify the client signature by decrypting the client signature using client 112's public key and comparing the decrypted client signature with a hash value of the received data. A match between the decrypted client signature and the hash value of the received data indicates to server 122 that 1) the sender of the data had access to client 112's private key 312, and 2) the data has not been altered since the data was signed by the sender. If only client 112 is assumed to have access to client 112's private key 312, the match may further indicate to server 122 that client 112 is indeed the sender of the data. If the decrypted client signature and the generated hash value of the received data do not match, server 122 may halt process 400. In some embodiments, if the decrypted client signature and the generated hash value of the received data do not match, server 122 may save the client signature and/or the data for further examination, for example, by a system administrator or a security analysis software.

Server 122's verification of the client signature may be performed independently from central server 130's verification of the client signature at step 414 so as to prevent a single point of failure in system 300. For example, server 122 may independently generate a hash value of the received data without sharing the hash value with central server 130 or vice versa. Further, server 122 may retrieve client 112's public key from a source is not shared with central server 130.

The optional step 424 may be performed any time after the communication is received from client 112 at step 408 and before the communication is processed (or finished being processed) at step 406. For example, the optional step 424 may be performed in parallel with one or more of steps 410-422. In another example, the optional step 424 may be performed after verifying the central-server signature 422 or before transmitting the client signature and the data to central server 130 at step 410.

In some embodiments, server 122 may further verify that the received data (or the content of the communication) is in accordance with policies associated with system 300. For example, server 122 may perform one or more verifications that are similar to the verifications performed by central server 130 at step 416. In embodiments where server 122 verifies that client 112 and/or server 122 are listed as being active in a list of active entities accessible by central server 130, the list of active entities may be the same list or a different list from the list that can be accessed by central server 130. In embodiments where the list is different from the list accessible by central server 130, client 112 or server 122 may be immediately prevented from communicating with other entities in system 100 simply by altering either the list accessible to server 122 or the list accessible to central server 130.

In embodiments where a plurality of client signatures is received, server 122 may verify at least one client signature. Additionally, the client signature verified by server 122 may be different from the client signature verified by central server 130. In some embodiments, server 122 may verify all of the plurality of client signatures.

At step 426, server 122 may process the communication. For example, server 122 may process the communication after step 422 and/or step 424. In some embodiments, server 122 may partially process the communication before step 422 and/or step 424, and server 122 may finish processing the communication after step 422 and/or step 424. In some embodiments, server 122 may send an indication to client 112 that the communication has been processed.

In embodiments where the data included in the communication includes an expiration date/time associated with the data and/or unique nonce data, server 122 may determine whether the data has expired and/or whether server 122 has received data with the same nonce data prior to processing the communication. If the data is determined to be expired based on the expiration date/time the same nonce data has been received previously, process 400 may be halted (i.e., communication may not be processed).

Figure 5:
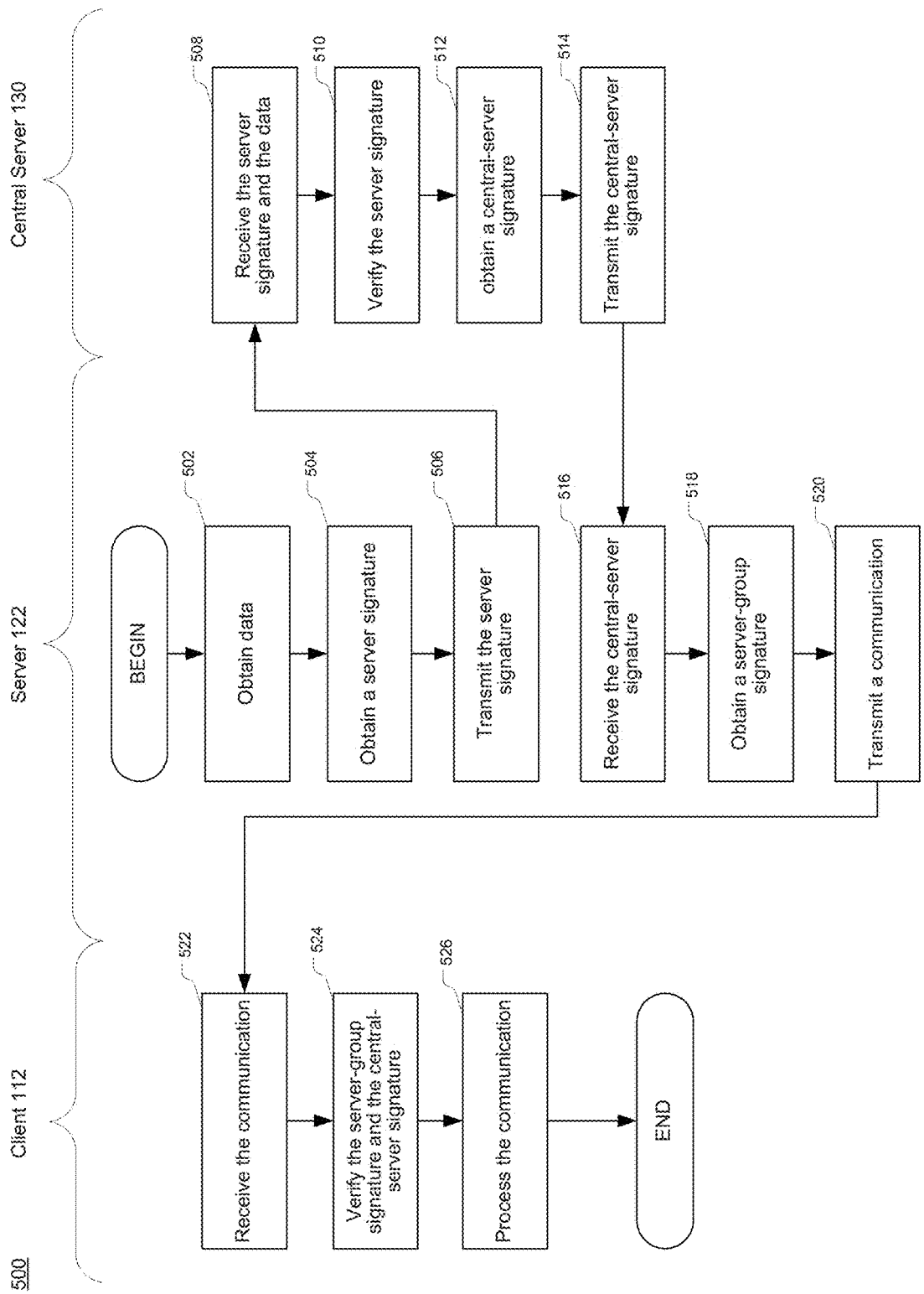
FIG. 5 is a flow diagram of a process for sending a trusted communication from a server to a client in accordance with embodiments of the present invention.

FIG. 5 is a flow diagram of a process 500 for sending a trusted communication from server 122 to client 112 in system 300 of FIG. 3 in which concepts consistent with the principles of the invention may be implemented. As shown in FIG. 5, steps 502, 504, 506, 516, 518, and 520 may be implemented by server 122; steps 508, 510, 512, and 514 by central server 130; and steps 522, 524, and 526 by client 112. In some embodiments, however, steps 502, 504, 506, 516, 518, and 520 may be implemented by client 112 and steps 522, 524, and 526 may be implemented by server 122. In some embodiments, steps 502, 504, 506, 516, 518, and 520 may be implemented by client 112 and steps 522, 524, and 526 may be implemented by another client. In some embodiments, however, steps 502, 504, 506, 516, 518, and 520 may be implemented by server 122 and steps 522, 524, and 526 may be implemented by another server.

At a step 502, server 122 may obtain data to be sent to client 112. In some embodiments, the data may be generated by server 122. In some embodiments, the data may be obtained by one or more devices or components that are associated with server 122. For example, the data may be obtained from an instant messaging system that is in communication with server 122 and may include a message destined for client 112. In some embodiments, the data may be provided by a user of system 300. For example, a user may provide data directly to server 122, for example, via a user interface of server 122. Alternatively, or additionally, a user may provide data indirectly to server 122, for example, by causing the data to be transmitted to server 122 or by causing server 122 to retrieve a user-generated data.

The data may be any data that server 122 has access to. For example, in system 200 of FIG. 2, server 122 may obtain data that includes instructions on how to configure smart thermostat 112b or a new firmware to be installed in vehicle 230's entertainment system 112d. In another example, the data may include data for software running on the portable device 112c.

In some embodiments, the data may include information identifying the sender (i.e., client 112) and/or the intended recipient(s). In some embodiments, the data may include a set of data. Further, the set of data may include data obtained from a plurality of sources or generated by a plurality of entities.

In some embodiments, the obtained data may be encrypted. For example, the obtained data may be encrypted using Elliptic Curve Diffie-Hellman (ECDH) algorithm, and only intended recipient or a plurality of recipients may decrypt the data.

In some embodiments, the obtained data may include expiration date/time associated with the data and/or unique nonce data.

At a step 504, server 122 may obtain a server signature. In some embodiments, the server signature may be generated based on at least a portion of the obtained data using server 122's private key 322. For example, server 122 may generate the server signature by generating a hash value of the data to be sent to client 112 and encrypting the generated hash with server 122's private key 322. In some embodiments, server 122 may generate the server signature by encrypting some or all of the data to be sent to client 112.

In system 300, a server signature is a digital signature generated using server 122's private key 322. However, in some embodiments, the server signature may be any information that can be used by client 112 and central server 130 to verify that the communication is indeed sent by server 122. For example, the server signature may be a passcode associated with server 122. As discussed above, however, a digital signature is preferable over the passcode as the passcode may be compromised, for example, when the communication is intercepted. The server signature may be generated by server 122. Alternatively, server 122 may obtain the server signature from another component such as a signature processor.

At a step 506, server 122 may transmit the server signature to central server 130. In some embodiments, server 122 may further transmit the data.

At a step 508, central server 130 may receive the server signature. In some embodiments, central server 130 may further receive the data.

At a step 510, central server 130 may verify the server signature. In some embodiments, central server 130 may verify the server signature using server 122's public key 336. In one example, central server 130 may verify the server signature by generating a hash value of the received data, decrypting the server signature using server 122's public key 336, comparing the decrypted signature with the generated hash value of the received data. A match between the decrypted server signature and the generated hash value of the received data indicates to central server 130 that 1) the sender of the data had access to server 122's private key 322, and 2) the data has not been altered since the data was signed by the sender. If only server 122 is assumed to have access to server 122's private key 322, the match may further indicate to central server 130 that server 122 is indeed the sender of the data. If the decrypted server signature and the generated hash value of the received data do not match, central server 130 may halt process 400. In some embodiments, if the decrypted server signature and the generated hash value of the received data do not match, central sever 130 notify server 122. Alternatively, central server 130 may not notify server 122. In some embodiments, central server 130 may save the server signature and/or the data for further examination, for example, by a system administrator or a security analysis software.

At a step 512, central server 130 may obtain a central-server signature generated based on at least a portion of the data. In some embodiments, the central-server signature may be generate using central server 130's private key 332. For example, the central-server signature may be generated by generating a hash value of the data and encrypting the hash value with central server 130's private key 332. In some embodiments, server 122 may generate the server signature by encrypting some or all of the data to be sent to client 112.

In system 300, as discussed above, a central-server signature is a digital signature generated using central server 130's private key. However, in some embodiments, the central-server signature may be any information that can be used by clients 110 to confirm that central server 130 has deemed the data as being trustworthy. For example, as discussed above, the central-server signature may be a passcode associated with central server 130.

In some embodiments, central server 130 may log that the central-server signature has been generated. The log may include at least a portion of the data and/or the server signature.

At a step 514, central server 130 may transmit the central-server signature to server 122. In some embodiments, central server 130 may further transmit the data and/or the server signature to server 122.

In some embodiments, central server 130 may transmit the central-server signature after determining that the received data (or the content of the communication) is in accordance with policies associated with system 300. For example, central server 130 may verify, by accessing a policy server (e.g., policy server 344), that server 122 is authorized to send a communication to client 112 and/or that client 112 is authorized to receive a communication from server 122. In another example, central server 130 may verify, by accessing a policy server (e.g., policy server 344), that client 112 and/or server 122 is not in any system-wide or global blacklist. A policy may also define, for example, a time period and frequency at which client 112 and server 122 may communicate. If central server 130 determines that the received data is not in accordance with the policies associated with system 300, central server 130 may halt process 500.

In some embodiments, central server 130 may transmit the central-server signature after inspecting the data. For example, central server 130 may verify that the data does not include any known malicious software code or instructions. If malicious software code or instructions are detected, central server 130 may halt process 500 in one example.

In some embodiments, central server 130 may have access to a list of active entities in system 300 and may transmit the central-server signature after verifying that client 112 and/or server 122 are listed as being active. If one or both of client 112 and server 122 are listed as being inactive or missing from the list, central server 130 may halt process 500. Therefore, by simply listing client 112 or server 122 as being inactive or removing client 112 or server 122 from the list, client 112 or server 122 may be immediately prevented from communicating with other entities in system 100.

At a step 516, server 122 may receive the central-server signature. In some embodiments, server 122 may further receive the data and/or the server signature.

At a step 518, server 122 may obtain a server-group signature generated based at least on a portion of the data. In some embodiments, the server-group signature may be generated using server group 125's private key 324. For example, the server-group signature may be generated by generating a hash value of the data and encrypting the hash value with server-group 125's private key 324. In some embodiments, server 122 may generate a server-group signature based at least on the data and the central-server signature.

In system 300, a server-group signature is a digital signature generated using server-group 125's private key 324. However, in some embodiments, the server-group signature may be any information that can be used by clients 110 to verify that the communication is indeed sent by one of the servers 120 in server group 125. For example, the server-group signature may be a passcode associated with server-group 125. As discussed above, however, a digital signature is preferable over the passcode as the passcode may be compromised, for example, when the communication is intercepted.

As discussed above in reference to FIG. 3, server group 125's private key 324 may be stored in data store 142 that may be accessible by each of the server 120 in server group 125. Therefore, prior to generating the server-group signature, server 122 may retrieve server group 125's private key 324 from data store 142. In some embodiments, server 122 may store a local copy of server group 125's private key 324. In these embodiments, server 122 may periodically update the local copy with the version stored in data store 142. Alternatively, server 122 may generate a server-group signature by sending the data and/or the central-server signature to a signature component and receiving a server-group signature generated by the signature component using server group 125's private key 324 accessible by the signature component. In some embodiments, the signature component and the gateway associated with server group 125 may implemented on the same entity.

In FIG. 5, step 518 is shown to be performed after step 516. However, in some embodiments, step 518 may be performed any time after step 502 and before step 520.

At a step 520, server 122 may transmit a communication to client 112. The communication may include the server-group signature and the central-server signature. In embodiments where neither of the server-group signature and the central-server signature is an encrypted version on the entire obtained data, the communication may further include the obtained data.

In some embodiments, server 122 may verify that the data is in accordance with policies associated with system 300 prior to transmitting the communication. For example, server 122 may verify, by accessing a policy server (e.g., policy server 344 and/or another policy server), that client 112 is authorized to send a communication to server 122 and/or that server 122 is authorized to receive a communication from client 130. A policy may also define, for example, a time period and frequency at which client 112 and server 122 may communicate. In another example, server 122 may verify, by accessing a policy server (e.g., policy server 344 and/or another policy server), that client 112 and/or server 122 is not in any system-wide or global blacklist. A policy may also define, for example, a time period and frequency at which client 112 and server 122 may communicate. If server 122 determines that the received data is not in accordance with the policies associated with system 300, server 122 may halt process 500. In some embodiments, server 122 may further verify that the communication does not include any known malicious software code or instructions. If malicious software code or instructions are detected, server 122 may halt process 500 in one example. In some embodiments, server 122 may verify that client 112 and/or server 122 are listed as being active in a list of active entities accessible by server 122. If one or both of client 112 and server 122 are listed as being inactive or missing from the list, server 122 may halt process 500. Therefore, by simply listing client 112 or server 122 as being inactive or removing client 112 or server 122 from the list, client 112 or server 122 may be immediately prevented from communicating with other entities in system 100. The list of active entities may be the same or different list that can be accessed by central server 130.

At a step 522, client 112 may receive the communication.

At a step 524, client 112 may verify the server-group signature and the central-server signature. In some embodiments, client 112 may verify the central-server signature using central server 130's public key 314. In one example, client 112 may verify the central-server signature by generating a hash value of the data included in the communication, decrypting the central-server signature using central server 130's public key 314, comparing the decrypted signature with the generated hash value of the data. A match between the decrypted central-server signature and the generated hash value of the data indicates to client 112 that central server 130 has deemed the data included in the communication to be trustworthy. More particularly, the match indicates to client 112 that central server 130 has verified that 1) one of the servers 120 in server group 125 is indeed the sender of the communication, and 2) the data has not been altered since the data was signed by server 122. If the decrypted central-server signature and the generated hash value of the data do not match, client 112 may halt process 500.

Client 112 may verify the server-group signature using server group 125's public key 324. In one example, client 112 may verify the server-group signature by generating a hash value of the data included in the communication, decrypting the server-group signature using server group 125's public key 324, comparing the decrypted signature with the generated hash value of the data. A match between the decrypted server-group signature and the generated hash value of the data may provide a confirmation to client 112 that 1) the data included in the communication is from one of the servers 120 in server group 125, and 2) the data has not been altered since the data was signed by server 122. If the decrypted server-group signature and the generated hash value of the data do not match, client 112 may halt process 500.

In some embodiments, instead of the server-group signature, server 122 may have transmitted the server signature to client 112 at step 520 instead of the server-group signature. In these embodiments, client 112 may have access to public keys of servers 120 and verify the received server signature using server 122's public key. However, it is preferable that server 122 generate and transmit a server-group signature, as opposed to a server signature, because each client 112 only needs to have access to and/or manage a single server group 125's public key 316 (in addition to its own private key and central server 130's public key). In embodiments where a server signature is transmitted to client 112, instead of a server-group key, each client may need to manage public keys of all servers 120 that client 112 can communicate with.

In some systems, however, clients 110 may not have the capability to store and/or manage a large number of keys. For example, in an IoT system (e.g., system 200), clients 110 may be implemented on low-power and small devices (e.g., smart thermostat 112*b*) that does not have sufficient storage capacity and/or processing power to store and/or manage a large number of keys.

In some embodiments, if client 112 halts process 500 because the verification of one or both of the signatures has failed, the signatures and/or the data may be stored for future examination, for example, by a system administrator or a security analysis software.

At step 526, client 112 may process the communication. In some embodiments, client 112 may partially process the communication before step 524, and server 122 may finish processing the communication after step 524. In some embodiments, client 112 may send an indication to server 122 that the communication has been processed.

In some embodiments after obtaining data at 502, server 122 may transmit the data and/or the server 122's signature generated at step 504 to at least one entity other than central server 130 (e.g., another server or central server). In these embodiments, each of these entities, after verifying that the data is trustworthy using its own verification process, may generate a digital signature using each its own private key and transmit the digital signature to server 122. Server 122, at step 506, may transmit these digital signatures to central server 130. Alternatively, these digital signature may be transmitted to central server 130 directly. Further, at step 510, central server 130 may further verify these digital signatures before transmitting the central-server signature to server 122.

In embodiments where the data included in the communication includes an expiration date/time associated with the data and/or unique nonce data, server 122 may determine whether the data has expired and/or whether client 112 has received data with the same nonce data prior to processing the communication. If the data is determined to be expired based on the expiration date/time the same nonce data has been received previously, process 500 may be halted (i.e., communication may not be processed).

Automated Mutual Authentication

Figure 6:
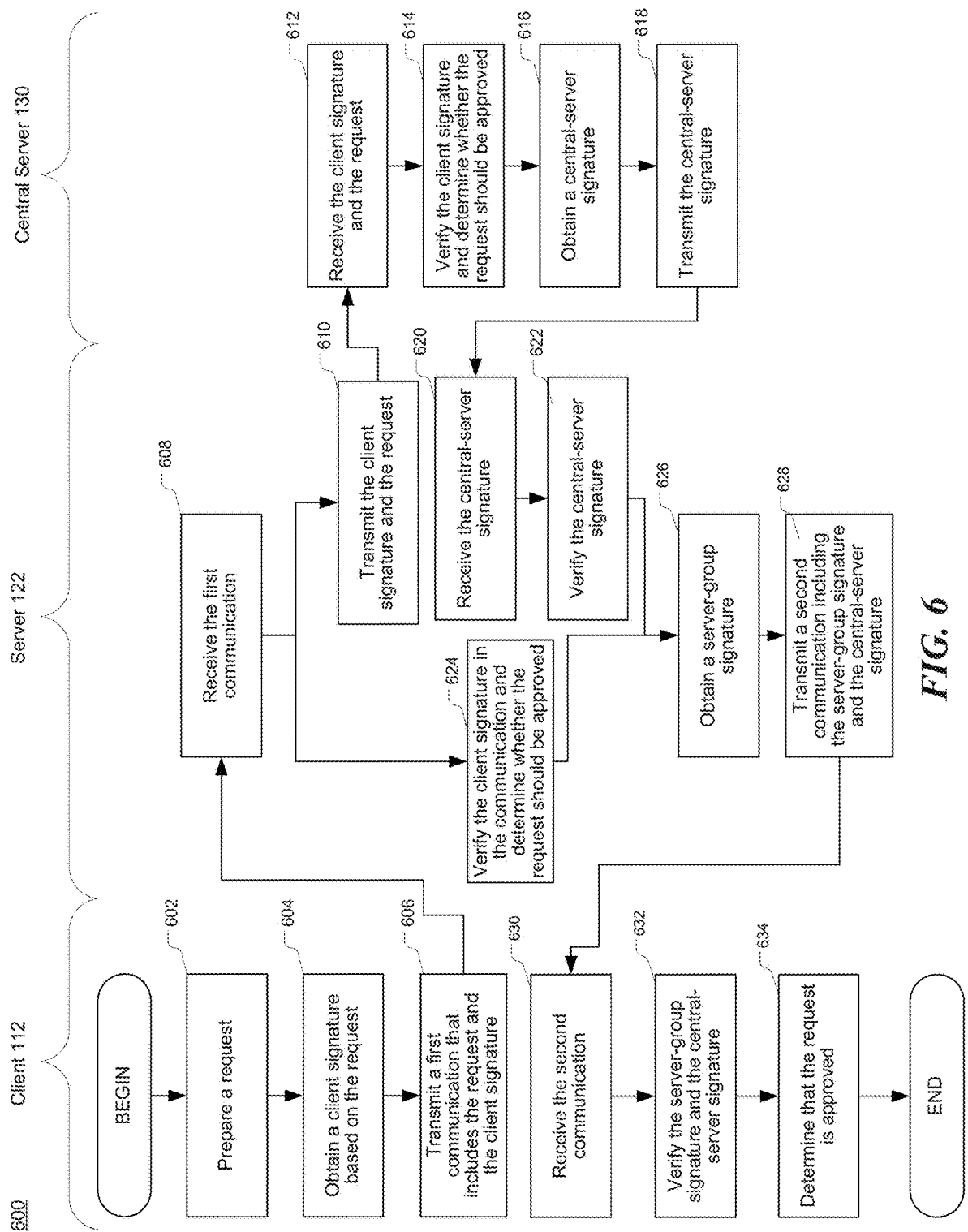
FIG. 6 is a flow diagram of a process for transmitting a request from a client to be approved by a server and a central server in accordance with embodiments of the present invention.

FIG. 6 is a flow diagram of a process 600 for transmitting an approval request from client 112 to be approved by server 122 and central server 130 in which concepts consistent with the principles of the invention may be implemented. As shown in FIG. 6, steps 602, 604, 606, 630, 632, and 634 may be implemented by client 112, steps 608, 610, 620, 622, 624, 626, and 628 by server 122, and steps 612, 614, 616, 618 by central server 130. In some embodiments, steps 602, 604, 606, 630, 632, and 634 may be implemented by server 122, steps 608, 610, 620, 622, 624, 626, and 628 by client 112. In some embodiments, steps 602, 604, 606, 630, 632, and 634 may be implemented by server 122, steps 608, 610, 620, 622, 624, 626, and 628 by another server. In some embodiments, steps 602, 604, 606, 630, 632, and 634 may be implemented by client 112, steps 608, 610, 620, 622, 624, 626, and 628 by another client.

At a step 602, client 112 may prepare an approval request. An approval request may be prepared by client 112 when client 112 needs an approval from server 122 before taking an action. For example, the approval request may be a user authentication request when a user is attempting to login to client 112; the user authentication request may include authentication information of a user such as user identifying information, password (encrypted or in clear text), login date and time, and requested duration of the approval.

Steps 604-624 are similar to steps 404-424 of FIG. 4, except that the data in steps 602-610 is a request. Steps 626-632 are similar to steps 518-524 of FIG. 0.5, except that the data in steps 626 and 628 is the request prepared at step 602.

Furthermore, at one or both of steps 614 and 624, server 122 and/or central server 130 may independently determine whether the request should be approved. In some embodiments, the determination on whether the request should be approved may include accessing one or more policy servers (e.g., policy server 144). For example, if the request is an authentication request for a user to login to client 112, the determination on whether the request should be approved may include querying one or more policy servers to determine whether the user is an authorized user of client 112, server-group 125, and/or system 300.

At a step 634, client 112 may determine that the request is approved. In some embodiments, the determination that the request is approved may cause another process to be started. For example, in if the request was an authentication request for a user to login to client 112, a process for logging in the user to client 112 may begin.

Process 600 may enable automated communications between client 112 and server 122. In an IoT systems, for example, it may be necessary for entities to establish trust automatically, without human intervention such as entering usernames or passwords. Process 600 may enable client 112 and server 122 to digitally sign requests using their private key as discussed above, and assert and verify each other's identity without the need for usernames, passwords, or other human-assisted methods of establishing trust.

In some embodiments, as discussed above, process 600 may also provide two-factor (or multi-factor) authentication. That is, in some embodiments, a request may be verified by two or more entities (e.g., server 122 and central server 130) before the request is approved. Since it is more difficult for an attacker to breach multiple entities (e.g., to obtain their private keys) than breaching a single entity, two-factor authentication may improve the overall security of the system.

Adding, Removing, Replacing, or Revoking Keys Using Reset Keys (Backup Authentication)

Figure 7:
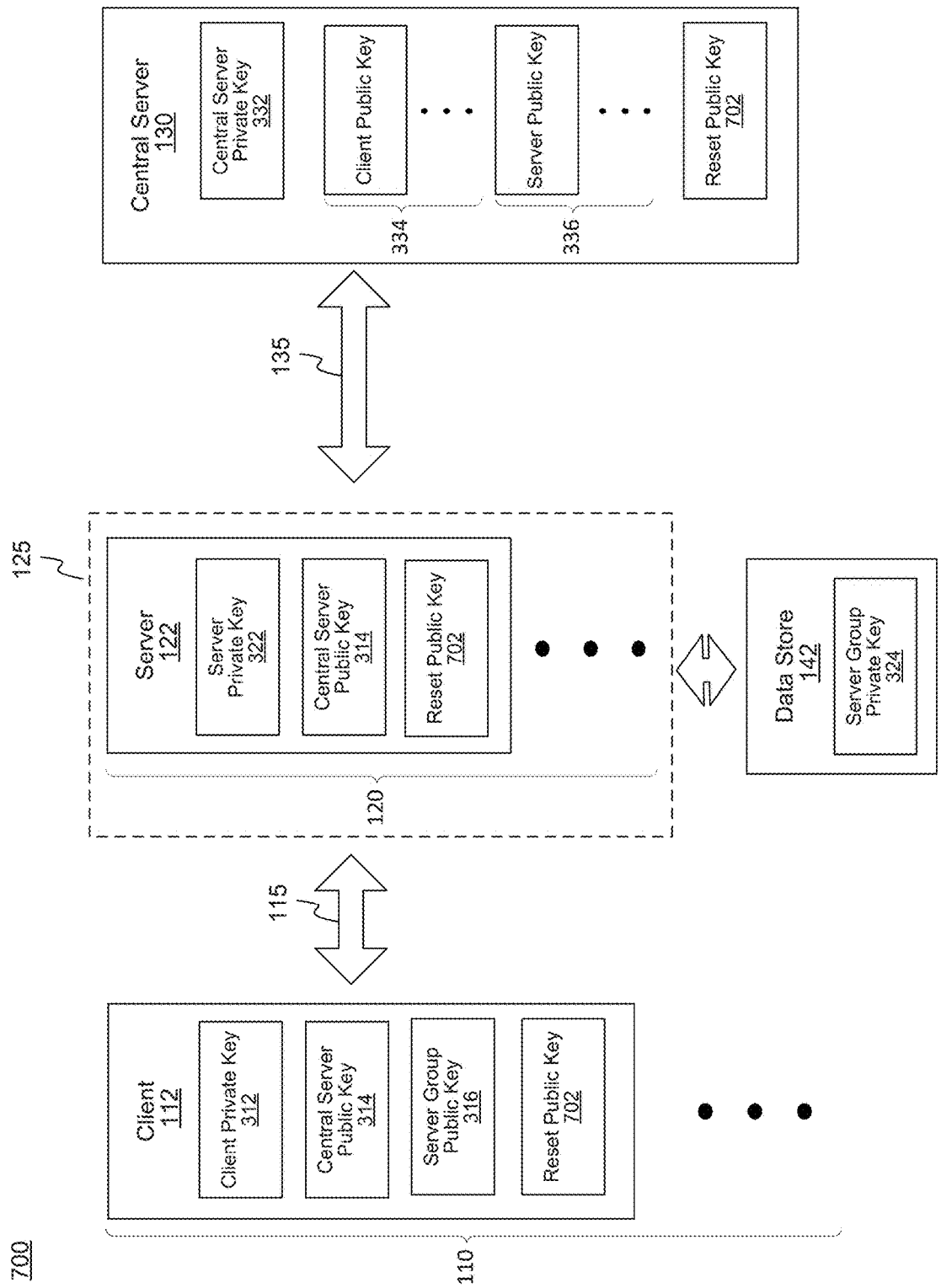
FIG. 7 illustrates a system in accordance with embodiments of the present invention.

FIG. 7 illustrates an exemplary system 700 in which concepts consistent with the principles of the invention may be implemented. System 700 is similar to system 300 of FIG. 3, except that system 700 is capable of remotely adding, removing, revoking, and/or replacing the keys that can be accessed by clients 110, servers 120, and/or central server 130. Further, entities in system 700 may have access to (or a copy of) at least one reset public key 702. In some embodiments, a single copy of reset public key 702 may be shared by a plurality of entities. Alternatively, each entity may have access to its own copy of reset public key 702. In some embodiments, entities in system 700 may have access to (or a copy of) a plurality of reset public keys. In some embodiments, entities in system 700 may have access to (or a copy of) three reset public keys. In system 700, an entity that receives a communication that is encrypted or signed with a reset private key(s) corresponding to the reset public key 702 may store one or more keys included in the communication so that the keys can be accessed by the entity. Further, the communication may cause one or more keys that are currently accessible by the entity to be revoked and/or removed. In some embodiments, the communication may cause one or more keys that are currently accessible by the entity to be replaced with the keys that are included in the communication. For example, the communication may cause server group 125's public key, central server 130's public key, and/or reset public key 702 to be replaced with the keys included in the communication.

In some embodiments, such a communication may be used to replace server group 125's public key and/or central server 130's public key periodically or when requested by a user (e.g., system administrator). In some embodiments, such a communication may be used to replace server group 125's public key and/or central server 130's public key when a server 122 and/or central server 130 is determined to be compromised. In some embodiments, such a communication may be used to replace server group 125's public key and/or central server 130's public key when server group 125's private key and/or central server 130's private key are determined to be compromised (e.g., a backup file containing the private keys is lost). In some embodiments, such a communication may be used to replace server group 125's public key and/or central server 130's public key when an entity is retired, replaced, moved, or altered. For example, such a communication may be used to replace server group 125's public key and/or central server 130's public key when a server 122 and/or central server 130 is updated with a new hardware or software.

Figure 8:
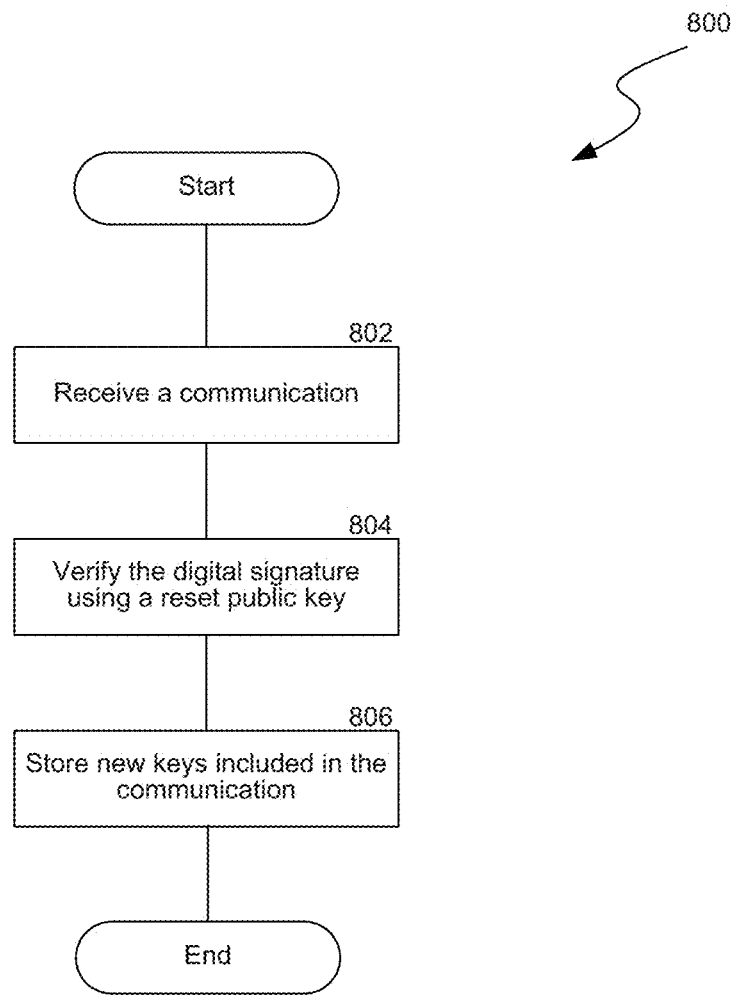
FIG. 8 is a flow diagram of a process for adding, removing, revoking, and/or replacing digital keys accessible by various entities in accordance with embodiments of the present invention.

FIG. 8 is a flow diagram of a process 800 for adding, removing, revoking, and/or replacing digital keys accessible by various entities in system 700 in which concepts consistent with the principles of the invention may be implemented.

At a step 802, an entity (e.g., client 112, server 122, or central server 130) of system 700 may receive a communication. The communication may include at least one digital signature generated using at least one private key and at least one new key. In some embodiments, the communication may include a digital signature that is generated using a plurality of reset private keys. For example, an intermediate digital signature may be generated using a first reset private key, and a final digital signature may be generated using a second reset private key based on the intermediate digital signature. In some embodiments, the communication may include a plurality of digital signatures generated using a plurality of reset private keys. The communication may be transmitted from any one of clients 110, servers 120, and central server 130. Alternatively, the communication may be transmitted from another entity in or outside system 700.

The new keys included in the communication may include, for example, at least one of reset public keys, central server 130's public key 313, server group 125's public key 316, client 122's private key, and server 122's private key. One or more of the new keys (e.g., private keys) may be encrypted before being included in the communication. In some embodiments, new keys included in the communication may include a plurality of reset public keys. In some embodiments, new keys included in the communication may include three reset public keys.

At a step 804, the entity may verify the digital signature using at least one reset public key 702 accessible by the entity. Verifying the digital signature may include verifying that the digital signature was generated by a reset private key that corresponds to the reset public key 702. In embodiments where the digital signature is generated using a plurality of reset private keys, the digital signature may be verified using a plurality of public keys that correspond to the plurality of reset private keys in an order that was signed using the plurality of reset private keys. In the above example where an intermediate digital signature is generated using a first reset private key and a final digital signature is generated using a second reset private key based on the intermediate digital signature, the final digital signature may be first decrypted using a second public key corresponding to the second reset private key and the subsequently decrypted using a first public key corresponding to the first reset private key. In embodiments where a plurality of digital signatures are received, a plurality of reset public keys 702 may be used to verify the plurality of digital signatures.

At a step 806, the entity may store the new key(s) included in the communication so that the new key(s) may be accessible by the entity. In some embodiments, the new key(s) may be stored in the entity or in a separate storage component accessible by the entity. In some embodiments, the entity may load the new key to a signature processor accessible by the entity. In some embodiments, the new key(s) may replace the keys that are currently accessible by the entity. At an optional step, the entity may revoke or remove one or more keys that are accessible by the entity. In some embodiments, the entity may prevent future access to the revoked keys. In some embodiments, the communication may further include a reset instruction that identifies the new keys included in the communication as wells the keys to be revoked, removed, or replaced.

In some embodiments, at step 804, the entity may receive a communication that includes at least one digital signature generated using at least one private key without any new keys. In these embodiments, after verifying the digital signature at step 804, the entity may remove or revoke one or more keys that are accessible by the entity without adding new keys. The communication may include a reset instruction that identifies the keys to be removed or revoked.

In some embodiments, the entity's ability to add, remove, replace, or revoke keys may depend on the private key that was used to generate the digital signature. For example, when the entity receives a digital signature generated using a first private key, the entity may be allowed to add new keys. However, if the entity receives a digital signature generated using a second private key, the entity may be allowed to add new keys and remove the keys that are currently accessible to the entity. In another example, if the entity receives a digital signature generated using a third private key, the entity may only be allowed to add public keys, but not private keys.

At an optional step, the entity may notify the sender of the communication that the new keys have been added.

Identity Abstraction

Figure 9:
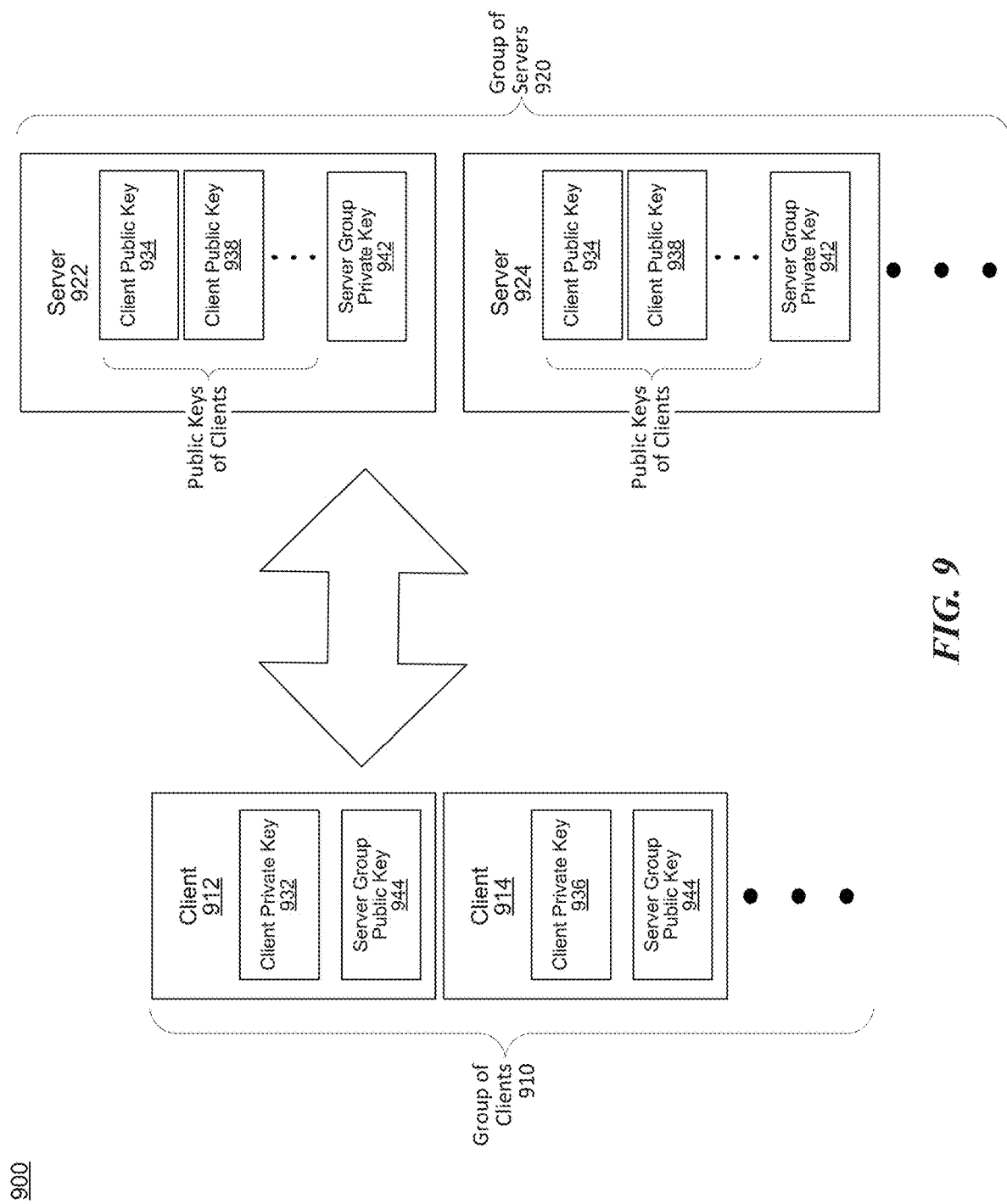
FIG. 9 illustrates a system in accordance with embodiments of the present invention.

FIG. 9 illustrates a system 900 in which concepts consistent with principles of the invention may be implemented. System 900 includes a group of clients 910 that includes, for example, clients 912 and 914, and a group of servers 920 that includes, for example, servers 922 and 924. At least some of the communications between clients in group of clients 910 and servers in group of servers 920 may be signed communications that include digital signatures.

In conventional systems, a client that can receive signed communications from a plurality of servers requires a public key for each server in the plurality of servers. For example, if a client communicates with a group of servers that includes thousands of servers, the client would need to have access to the thousands of server public keys. In some systems, however, clients may not have the capability to store and/or manage a large number of keys. For example, in an IoT system, clients may be implemented on low-power and small devices that do not have sufficient storage capacity and/or processing power to store and/or manage a large number of keys.

In contrast, clients 910 in system 900 may require a single public key associated with group of servers 920. For example, in system 900, servers in group of servers 920 (e.g., servers 922 and 924) may send communications to clients in group of clients 910 that includes a digital signature generated using a common private key (i.e., server group's private key 942) that can be accessed by the servers in group of servers 920. Thus, clients 910 require a single public key that corresponding to the common private key (i.e., server group's public key 944) to verify the included digital signature signed by servers in group of server 920. Server group's private key 942 may be stored in each server. Alternatively, server group's private key 942 may be stored in a shared storage.

Figure 10:
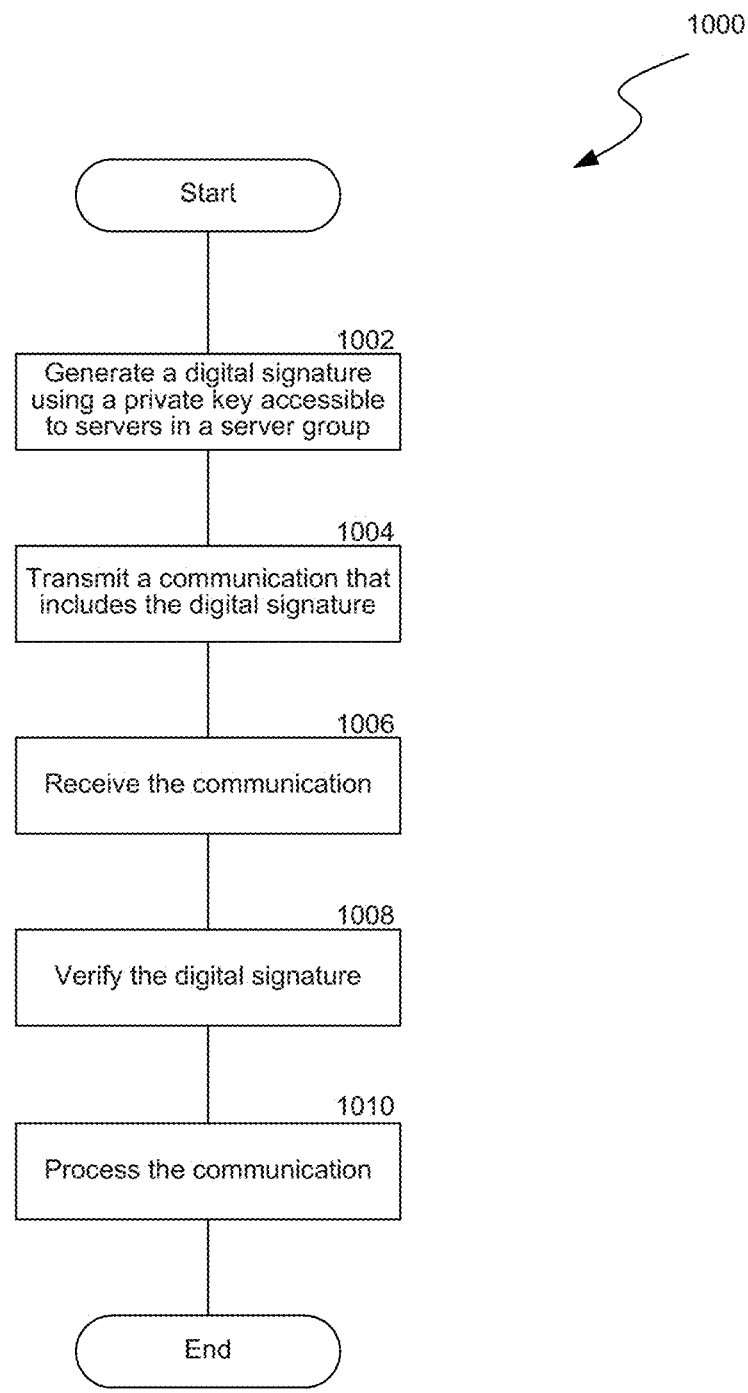
FIG. 10 is a flow diagram of a process for transmitting digitally signed communications by a server in a group of servers in accordance with embodiments of the present invention.

FIG. 10 is a flow diagram of a process 1000 for transmitting digitally signed communications by a server 922 in a group of servers 920 in system 900 of FIG. 9.

At a step 1002, server 922 may obtain access to a private key 942 associated with server group 920. In some embodiments, server 922 may obtain access to private key 942 by being authenticated by another entity. For example, server 922 may obtain access to private key 942 by sending a digital signature generated using server 922's private key to an authentication server. In this example, the authentication, after verifying the digital signature, may authorize server 922 to access private key 942.

At a step 1004, server 922 may generate a digital signature using private key 942. The digital signature may be based on data to be transmitted to client 912. Client 912 may be one of a plurality of clients (e.g., clients in group of clients 910) that may communicate with servers in group of servers 920, including server 922.

At a step 1006, server 922 may transmit a communication to client 912. The communication may include the data to be transmitted to client 912 and the generated digital signature.

At a step 1008, client 912, after receiving the communication from server 922, may verify the digital signature included in the communication using a public key 944 that corresponds to the private key 942. In some embodiments, clients in group of clients 910 may have access to the public key.

At a step 1010, client 912 may verify the digital signature.

At a step 1012, client 912, after verifying the digital signature, may process the communication. In some embodiments, client 912, after verifying the digital signature, may finish processing the communication.

Trusted Communications Between Components within a Single Device

Figure 11:
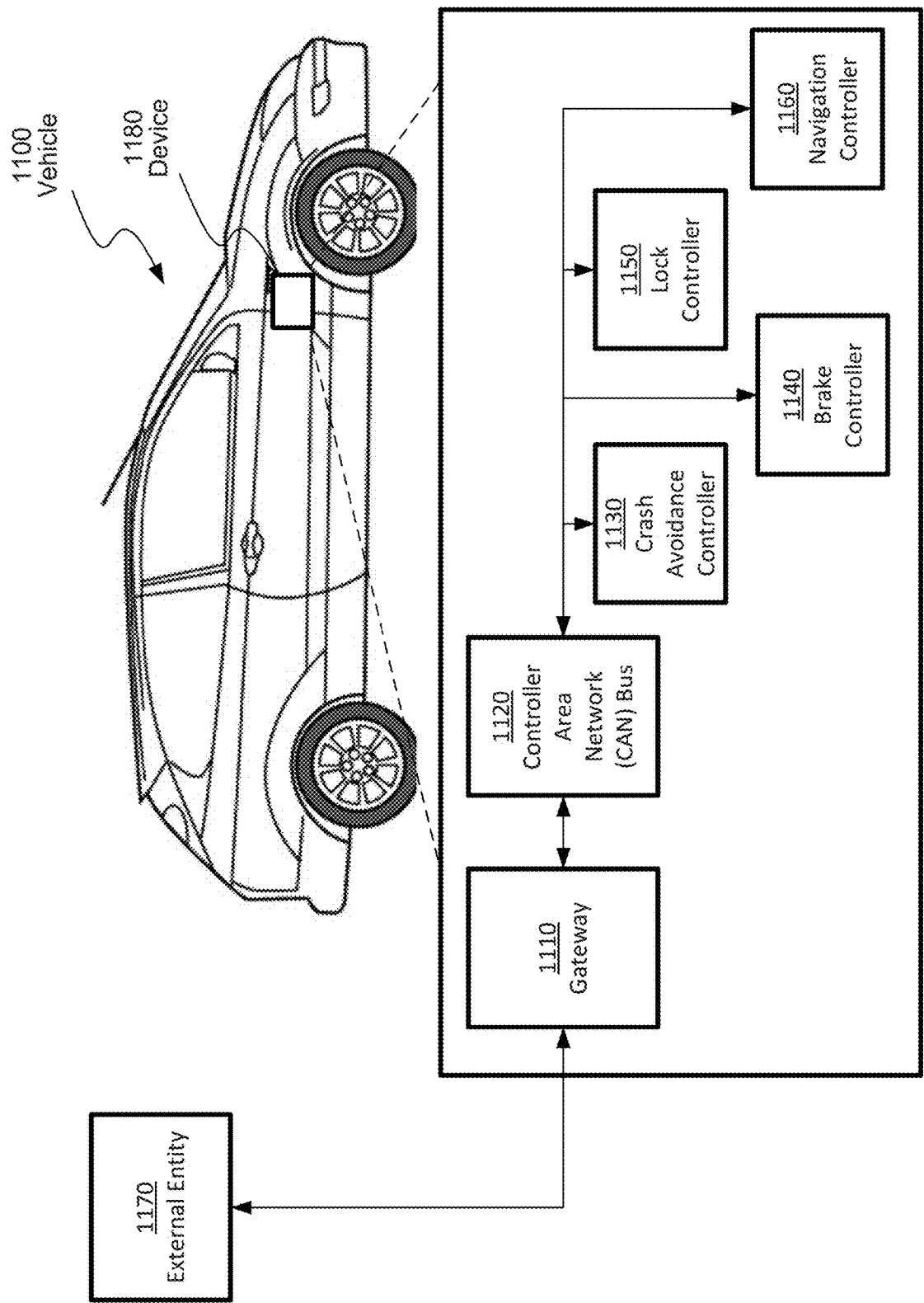
FIG. 11 illustrates an example of a vehicle including a device in accordance with the disclosed embodiments.

FIG. 11 illustrates an example of a vehicle 1100 in accordance with the disclosed embodiments. Vehicle 1100 includes a device 1180, and device 1180 is similar to system 300 of FIG. 3, except that clients 110 and servers 120 are implemented as various controllers (e.g., electronic control units (ECUs) and motor control units (MCUs)) within device 1180 and central server 130 is implemented as a gateway 1110 also within device 1180. In some embodiments, vehicle 1100 may be, for example, a car, motorcycle, boat, or aircraft.

As shown in FIG. 11, device 1180 may include one or more controllers, a bus system (e.g., controller-area network (CAN) bus 1120 or local interconnect network (LIN) bus), and a gateway 1110. In the example of FIG. 11, controllers included in device 1180 may include, for example, crash avoidance controller 1130, brake controller 1140, lock controller 1150, and navigational controller 1160. Further, vehicle 1100 may include hundreds of additional ECUs and MCUs (not shown) that are connected to each other via CAN bus 1120. In some embodiments, device 1180 may include a plurality of bus systems (e.g., a plurality of CAN buses) connected to each other via gateway 1110.

In device 1180, due to complexity for example, the controllers in device 1180 may be designed and/or manufactured by multiple suppliers, and subsequently assembled and/or integrated by a vehicle manufacturer as a single device for use in vehicle 1100. For example, CAN bus 1120 may be manufactured by a first supplier, crash avoidance controller 1130 by a second supplier, brake controller 1140 by a third supplier, and navigation controller 1160 by a fourth supplier. Subsequently, a vehicle manufacturer may assemble the controllers into a single device 1180, and connect device 1180 to various parts of vehicle 1100 (e.g., brakes, entertainment systems, locks, etc.).

Despite the controllers being designed and/or manufactured by different suppliers, the controllers may need to communicate with each other to provide various functionalities of vehicle 1100. In one example, crash avoidance controller 1130 may be configured to detect when a vehicle in front of vehicle 1100 is braking abruptly and transmit an instruction to brake controller 1140 requesting brakes in vehicle 1100 to be engaged. In another example, navigation controller 1160 may detect that vehicle 1100 is traveling above a predetermined speed and transmit an instruction to lock controller 1150 requesting locks in vehicle 1100 to be locked. To that end, CAN bus 1120 may enable hundreds of controllers in vehicle 1100 to communicate with each other using only a few wires (i.e., bus lines).

However, the flexibility of CAN bus 1120 may cause device 1180 to become vulnerable to malicious attacks. For example, an unauthorized controller may be connected to device 1180 via CAN bus 1120, and such a controller may be programmed to give an attacker with control of various parts of vehicle 1100. Accordingly, to prevent such attacks, the controllers may use trusted communications to communicate with each to other via CAN bus 1120. For example, a controller receiving a communication (e.g., containing instructions) may verify that the communication was indeed transmitted by an authorized controller. To that end, as described below with respect to FIG. 12, the controllers may use a process 1200 similar to process 400 of FIG. 4 and/or process 500 of FIG. 5 to communicate with each other. Gateway 1110 may implement the functions of central server 130.

As further shown in FIG. 11, gateway 1110 may communicate with an external entity 1170. For example, gateway 1110 may be capable of connecting to the Internet (e.g., via W-Fi or cellular network) and may communicate with external entity 1170 via the Internet. In another example, gateway 1110 may communicate with external entity 1170 via vehicle 1100's ODB-II interface. In some embodiments, gateway 1110 may receive data destined for one or more controllers and/or gateway 1110 from external entity 1170. For example, gateway 1110 may receive a new firmware for one of the controllers.

To ensure that data received by gateway 1110 is from an authorized external entity (e.g., a server associated with one of the suppliers of the controllers or the vehicle manufacturer), the communications between external entity 1170 and gateway 1110 may be trusted communications. In some embodiments, external entity 1170 and gateway 1110 may use process 400 and/or 500 of FIGS. 4 and 5 to communicate with each other. In these embodiments, external entity 1170 may be implemented as a server 122 of system 300 and gateway 1110 as a client 112 of system 300. Further, gateway 1110 may implement functions of central server 130. Alternatively, or additionally, another external entity may implement functions of central server 130.

In some embodiments, device 1180 may include a plurality of gateways. For example, device 1180 may include an in-vehicle gateway connecting one or more controllers and an external gateway connecting one or more external entities. In this example, the in-vehicle gateway may be connected to the external gateway such that one or more controllers can communicate with one or more external entities. A firewall may be implemented between in-vehicle gateway and the external gateway, regulating the communications between them. In these embodiments, the in-vehicle gateway may implement functions of central server 130 for communications between the controllers of device 1180. Further, the external gateway may implement functions of central server 130 for communications between one or more controllers and one or more external entities.

In some embodiments, external entity 1170 may communicate with gateway 1110 via a command-line interface.

Figure 12:
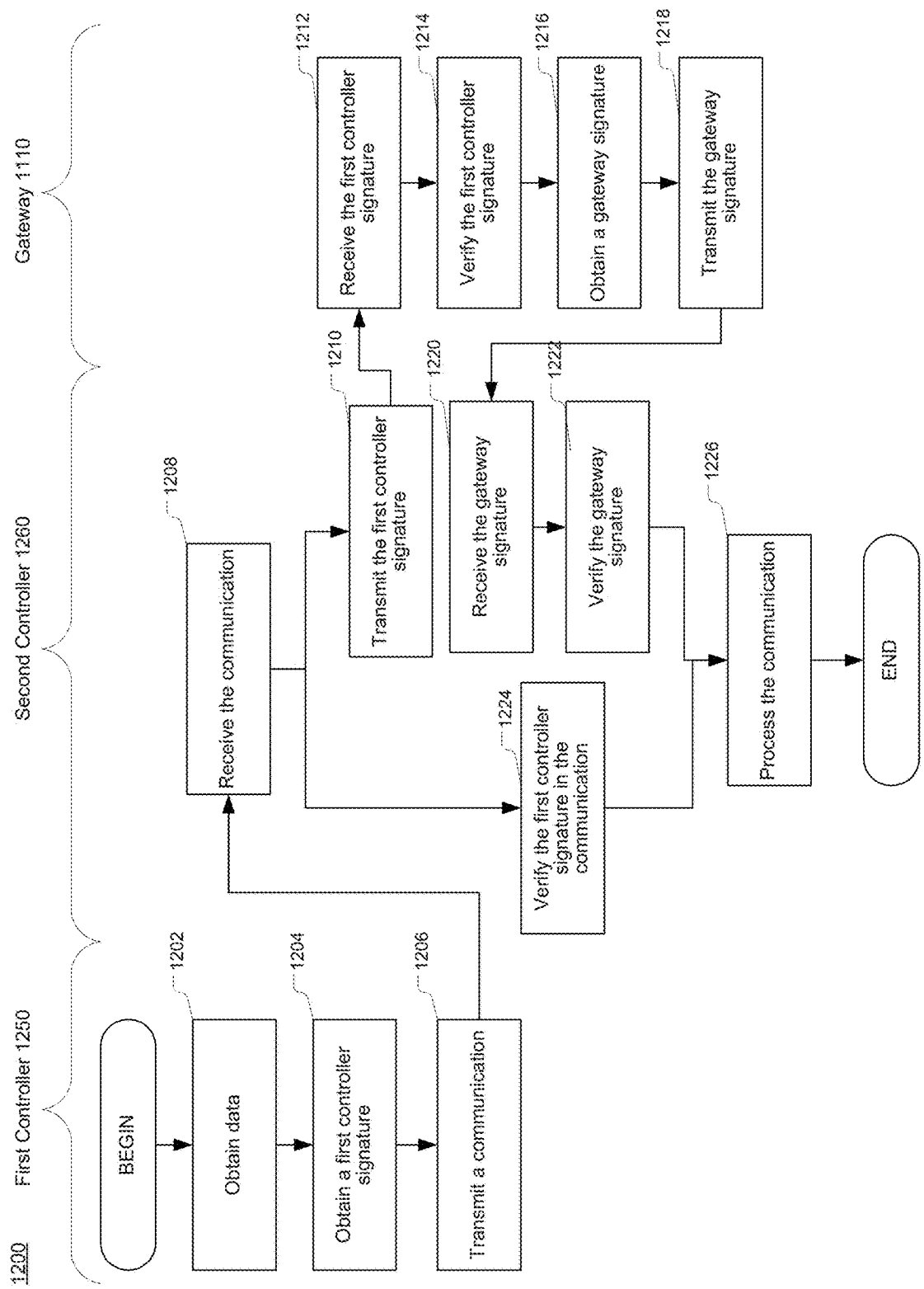
FIG. 12 illustrates an example of a process for sending a trusted communication from a first controller of a device to a second controller of the device in accordance with the disclosed embodiments.

FIG. 12 illustrates an example of a process 1200 for transmitting a trusted communication from a first controller 1250 to second controller 1260 in accordance with the disclosed embodiments. In one example, first controller 1250 may be crash avoidance controller 1130 and second controller may be brake controller 1140 in device 1180.

At a step 1202, first controller 1250 may obtain data to be sent to second controller 1260. In some embodiments, the data may be generated by first controller 1250. Alternatively, or additionally, first controller 1250 may retrieve or receive the data that was obtained or generated by one or more devices or components that are associated with, and/or connected to, first controller 1250. For example, first controller 1250 may retrieve or receive sensor data from a sensor component connected to first controller 1250.

The data may be any data that first controller 1250 can access. For example, in system 1100 of FIG. 11, crash avoidance controller 1130 may obtain data that includes a distance between vehicle 1100 and a vehicle in front of vehicle 1100. In another example, brake controller 1140 may obtain data that includes the current status of the brakes (e.g., whether the brakes are engaged or not). In yet another example, navigation controller 1160 may include a current location and/or current speed of vehicle 1100.

In some embodiments, the data may be provided by a user. For example, a user may provide data directly to first controller 1250 via a user interface connected to first controller 1250 or via a smartphone. The user interface may be implemented on, for example, vehicle 1100's entertainment system. Alternatively, or additionally, a user may provide data indirectly to first controller 1250, for example, by causing the data to be transmitted to first controller 1250 or by causing first controller 1250 to retrieve the user-generated data from another component or controller.

In some embodiments, the data may include information identifying the sender (i.e., first controller 1250) and/or the intended recipient(s). In some embodiments, the data may include a set of data. Further, the set of data may include data obtained from a plurality of sources or generated by a plurality of components or controllers.

At a step 1204, first controller 1250 may obtain a first controller signature. In some embodiments, the first controller signature may be generated based on at least a portion of the obtained data using first controller 1250's private key. For example, first controller 1250 may generate the first controller signature by generating a hash value of the obtained data and encrypting the generated hash with first controller 1250's private key. In some embodiments, first controller 1250 may generate the first controller signature by encrypting a portion or all of the data to be sent to server 120 using first controller 1250's private key. In some embodiments, first controller 1250's private key may be stored on a secure element associated with first controller 1250.

A first controller signature may be a digital signature generated using first controller 1250's private key. However, in some embodiments, the client signature may be any information that can be used by second controller 1260 and/or gateway 1110 to verify that the data is indeed sent by first controller 1250 and/or that the data has not been altered after the data was transmitted by first controller 1250. For example, the first controller signature may be a passcode associated with first controller 1250. A digital signature, however, is preferable over the passcode as the passcode may be compromised, for example, when the data is intercepted. In another example, the first controller signature may be a hash value of the obtained data. The digital signature may be generated by first controller 1250. Alternatively, first controller 1250 may obtain the digital signature from another component such as a signature processor.

In embodiments where first controller 1250 has access to a plurality of private keys, first controller 1250 may generate a first controller signature based on the plurality of private keys. Alternatively, first controller 1250 may generate a plurality of first controller signatures based on the plurality of private keys.

At a step 1206, first controller 1250 may transmit a communication. The communication may be destined for second controller 1260 and/or via one or more bus systems (e.g., CAN bus 1120). Further, the communication may include the generated first controller signature and/or the obtained data. In embodiments where the first controller signature is an encrypted version of the entire data, the communication may include the generated first controller signature without the data. In some embodiments, the communication may include additional data other than the obtained data and the generated first controller signature. For example, the communication may include, in addition to the obtained data and the generated first controller signature, identification of the algorithm used to generate the first controller signature. In embodiments where first controller 1250 generated a plurality of first controller signatures, the communication may include the plurality of client signatures.

In some embodiments, first controller 1250 may transmit the communication via a plurality of bus systems and one or more gateways. For example, first controller 1250, which may be connected to a first bus system, may transmit the communication via an in-vehicle gateway to a controller on a second bus system. The first and second bus system may be based on different protocols and/or standards. For example, the first bus system may be a CAN bus system while the second bus system may be a LIN bus system.

In some embodiments, first controller 125 may transmit the communication destined for an external entity. In these embodiments, first controller 125 may transmit the communication via a plurality of gateways. For example, first controller 125 may transmit the communication via an in-vehicle gateway and an external gateway. As described above, the in-vehicle gateway may be connected to the external gateway, and the gateways, as a collective, may connect one or more controllers connected to the in-vehicle gateway with one or more external entities connected to the external gateway.

At a step 1208, second controller 1260 may receive the communication. In some embodiments, second controller 1260 may receive the communication via a bus system (e.g., CAN bus 1120).

At a step 1210, second controller 1260 may transmit the first controller signature to gateway 1110. In some embodiments, second controller 1260 may further transmit the data to gateway 1110. In some embodiments, second controller 1260 may transmit the first controller signature and/or the data to gateway 1110 via CAN bus 1120. In some embodiments, second controller 1260 may transmit the entire communication that was received from first controller 1250 to gateway 1110.

At a step 1212, gateway 1110 may receive the first controller signature. In some embodiments, gateway 1110 may further receive the data. In some embodiments, server 112 may receive the entire communication that second controller 1260 received from first controller 1250.

At a step 1214, gateway 1110 may verify the first controller signature. In some embodiments, gateway 1110 may verify the first controller signature by generating a hash value of the received data, decrypting the first controller signature using first controller 1250's public key, and comparing the decrypted signature with the generated hash value of the received data. A match between the decrypted first controller signature and the generated hash value of the received data may indicate to gateway 1110 that 1) the sender of the data had access to first controller 1250's private key, and 2) the data has not been altered since the data was signed by the sender. If only first controller 1250 is assumed to have access to first controller 1250's private key, the match may further indicate to gateway 1110 that first controller 1250 is indeed the sender of the data. If the decrypted first controller signature and the generated hash value of the received data do not match, gateway 1110 may halt process 1200. That is, the communication may "die on the vine." In some embodiments, if the decrypted first controller signature and the generated hash value of the received data do not match, central sever 130 may notify second controller 1260 that the communication from first controller 1250 is not deemed trustworthy. Alternatively, gateway 1110 may not notify second controller 1260. In some embodiments, gateway 1110 may save the first controller signature and/or the data for further examination, for example, by a system administrator or a security analysis software.

In embodiments where the first controller signature is an encrypted version of a portion or the entire data, gateway 1110 may verify the first controller signature by decrypting the first controller signature using first controller 1250's public key and comparing the decrypted first controller signature with a portion or all of the received data.

In embodiments where a plurality of first controller signatures is received, gateway 1110 may verify at least one first controller signature. In some embodiments, gateway 1110 may verify all of the plurality of first controller signatures.

Second controller 1260 may obtain first controller 1250's public key numerous ways. In some embodiments, each controller in device 1280 may be preprogrammed at the time of manufacture with all public keys of device 1280. In some embodiments, public keys of each controller in device 1280 may be provided to each other during an initialization of device 1280. In some embodiments, public keys of each controller in device 1280 may be provided to each other during an initialization of device 1280 via gateway 1110.

At a step 1216, gateway 1110 may obtain a gateway signature generated based on at least a portion of the data using gateway 1110's private key. For example, the gateway signature may be generated by generating a hash value of the data and encrypting the hash value with gateway 1110's private key. In some embodiments, gateway 1110 may generate a gateway signature based on both the data and the first controller signature. In embodiments where the entire communication was transmitted to gateway 1110, gateway 1110 may generate a gateway signature based the entire communication. In embodiments where the first controller signature is an encrypted version of a portion or the entire data, the gateway signature may be generated based on a portion or all of the decrypted first controller signature.

In system 1100, a gateway signature is a digital signature generated using gateway 1110's private key. However, in some embodiments, the gateway signature may be any information that can be used by second controller 1260 to confirm that gateway 1110 has deemed the communication as being trustworthy. For example, the gateway signature may be a passcode associated with gateway 1110. In some embodiments, the gateway signature may simply be an identifier of gateway 1110. A digital signature, however, is preferable over a passcode or an identifier because the passcode and identifier may be compromised or already known by public.

In some embodiments, gateway 1110's private key may be stored on a secure element associated with gateway 1110.

At a step 1218, gateway 1110 may transmit the gateway signature to second controller 1260. In some embodiments, the gateway signature may be transmitted via CAN bus 1120. In some embodiments, gateway 1110 may further transmit the data and/or the first controller signature. In some embodiments, gateway 1110 may further transmit the entire communication sent by first controller 1250.

In some embodiments, gateway 1110 may transmit the gateway signature after determining that the received data is in accordance with policies associated with vehicle 1100 and/or device 1180. For example, gateway 1110 may verify, by accessing a policy controller (not shown), that first controller 1250 is authorized to send a communication to second controller 1260 and/or that second controller 1260 is authorized to receive a communication from first controller 1250. A policy may also define, for example, a time period and frequency at which first controller 1250 and second controller 1260 may communicate. If gateway 1110 determines that the received data is not in accordance with the policies associated with system 300, gateway 1110 may halt process 1200 and/or notify second controller 1260. As an example, a policy of device 1180 may define that only crash avoidance controller 1130 may communicate with brake controller 1140; that is, lock controller 1150 should not be able to engage brakes by sending instructions to brake controller 1140.

In some embodiments, gateway 1110 may transmit the gateway signature after inspecting the content of the communication or the received data. For example, gateway 1110 may verify that the communication does not include any known malicious software code or instructions. If malicious software code or instructions are detected, gateway 1110 may halt process 1200 and/or notify second controller 1260.

In some embodiments, gateway 1110 may have access to a list of active controllers in device 1280 and may transmit the gateway signature after verifying that first controller 1250 and/or second controller 1260 is listed as being active. If one or both of first controller 1250 and second controller 1260 are listed as being inactive or missing from the list, gateway 1110 may halt process 1200 and/or notify second controller 1260. Therefore, in these embodiments, by simply listing first controller 1250 or second controller 1260 as being inactive or removing first controller 1250 or second controller 1260 from the list, first controller 1250 or second controller 1260 may be immediately prevented from communicating with other controllers via CAN bus 1120.

The list of active controller may be updated, for example, by external entity 1170. For example, an authorized external entity 1170 may send a trusted communication containing an updated active controller list to gateway 1110. After verifying that the communication is indeed from an authorized external entity 1170, gateway 1110 may update the list of active controllers.

At a step 1220, second controller 1260 may receive the gateway signature. In some embodiments, second controller 1260 may further receive the data and/or the first controller signature. In some embodiments, gateway 1110 may further receive the entire communication. In some embodiments, second controller 1260 may receive the gateway signature via CAN bus 1120.

At a step 1222, second controller 1260 may verify the gateway signature. Second controller 1260 may verify the gateway signature, for example, using gateway 1110's public key. In one example, second controller 1260 may verify the gateway signature by generating a hash value of the received data, decrypting the gateway signature using gateway 1110's public key, and comparing the decrypted signature with the generated hash value of the received data. A match between the decrypted gateway signature and the generated hash value of the data is a confirmation to second controller 1260 that gateway 1110 has deemed the communication from first controller 1250 to be trustworthy. More particularly, the match is a confirmation to second controller 1260 that gateway 1110 has verified that 1) first controller 1250 is indeed the sender of the communication, and 2) the data has not been altered since the data was signed by first controller 1250.

At an optional step 1224, second controller 1260 may verify the first controller signature using first controller 1250's public key. In system 1100, for example, second controller 1260 may verify the first controller signature by decrypting the first controller signature using first controller 1250's public key and comparing the decrypted first controller signature with a hash value of the received data. A match between the decrypted first controller signature and the hash value of the received data indicates to second controller 1260 that 1) the sender of the data had access to first controller 1250's private key, and 2) the data has not been altered since the data was signed by the sender. If only first controller 1250 is assumed to have access to first controller 1250's private key, the match may further indicate to second controller 1260 that first controller 1250 is indeed the sender of the data. If the decrypted first controller signature and the generated hash value of the received data do not match, second controller 1260 may halt process 1200. In some embodiments, if the decrypted first controller signature and the generated hash value of the received data do not match, second controller 1260 may save the first controller signature and/or the data for further examination, for example, by a security analysis software or vehicle 1100 manufacturer.

Second controller 1260's verification of the first controller signature may be performed independently from gateway 1110's verification of the first controller signature at step 1214 so as to prevent a single point of failure in system 1100. For example, second controller 1260 may independently generate a hash value of the received data without sharing the hash value with gateway 1110 or vice versa. Further, second controller 1260 may retrieve first controller 1250's public key from a source is not shared with gateway 1110.

The optional step 1224 may be performed any time after the communication is received from first controller 1250 at step 1208 and before the communication is processed (or finished being processed) at step 1206. For example, the optional step 1224 may be performed in parallel with one or more of steps 1210-1222. In another example, the optional step 1224 may be performed after verifying the central-server signature 1222 or before transmitting the first controller signature and the data to gateway 1110 at step 1210.

In some embodiments, second controller 1260 may further verify that the received data (or the content of the communication) is in accordance with policies associated with vehicle 1100 and/or device 1180. For example, second controller 1260 may perform one or more verifications that are similar to the verifications performed by gateway 1110 at step 1216. In embodiments where second controller 1260 verifies that first controller 1250 and/or second controller 1260 are listed as being active in a list of active entities accessible by gateway 1110, the list of active entities may be the same list or a different list from the list that can be accessed by gateway 1110. In embodiments where the list is different from the list accessible by gateway 1110, first controller 1250 or second controller 1260 may be immediately prevented from communicating with other controllers simply by altering either the list accessible to second controller 1260 or the list accessible to gateway 1110.

In embodiments where a plurality of first controller signatures is received, second controller 1260 may verify at least one first controller signature. Additionally, the first controller signature verified by second controller 1260 may be different from the first controller signature verified by gateway 1110. In some embodiments, second controller 1260 may verify all of the plurality of first controller signatures.

At step 1226, second controller 1260 may process the communication. For example, second controller 1260 may process the communication after step 1222 and/or step 1224. In some embodiments, second controller 1260 may partially process the communication before step 1222 and/or step 1224, and second controller 1260 may finish processing the communication after step 1222 and/or step 1224. In some embodiments, second controller 1260 may send an indication to first controller 1250 that the communication has been processed. For example, in embodiments where the data includes instructions, second controller 1260 may execute the instructions.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

I claim:

1. A controller of a vehicle, the controller comprising:
   one or more processors configured to:
   receive data and a controller signature from a second controller, wherein the data comprises instructions to be executed by the controller, and wherein the controller signature is generated based on at least a first portion of the data;
   transmit the data and the controller signature to a gateway of the vehicle;
   receive a gateway signature from the gateway, wherein the gateway signature is generated based on at least a second portion of the data and transmitted to the controller after the gateway verified the controller signature;
   verify the gateway signature; and
   in response to verifying the gateway signature, process the data by executing the instructions.

2. The controller of claim 1, wherein the controller, the second controller, and the gateway are connected to a bus system.

3. The controller of claim 2, wherein the bus system is a controller-area network (CAN) bus system.

4. The controller of claim 2, wherein the data, the controller signature, and the gateway signature are received via the bus system and the data and the controller signature are transmitted via the bus system.

5. The controller of claim 1, wherein the gateway signature is transmitted to the controller after the gateway verifies that the controller is authorized to receive communication from the second controller.

6. The controller of claim 1, wherein the vehicle is one of a car, a motorbike, a boat, and an aircraft.

7. The controller of claim 1, wherein the controller signature is generated by the second controller using a private key associated with the second controller.

8. A method implemented on a controller of a vehicle for communicating with a second controller of the vehicle, comprising:
   receiving data and a controller signature from the second controller, wherein the data comprises instructions to be executed by the controller, and wherein the controller signature is generated based on at least a first portion of the data;
   transmitting the data and controller signature to a gateway of the vehicle;
   receiving a gateway signature from the gateway, wherein the gateway signature is generated based on at least a second portion of the data and transmitted to the controller after the gateway verified the controller signature;
   verifying the gateway signature; and
   in response to verifying the gateway signature, processing the data be executing the instructions.

9. The method of claim 8, wherein the controller, the second controller, and the gateway are connected to a bus system.

10. The method of claim 9, wherein the bus system is a controller-area network (CAN) bus system.

11. The method of claim 9, wherein the data, the controller signature, and the gateway signature are received via the bus system and the data and the controller signature are transmitted via the bus system.

12. The method of claim 8, wherein the gateway signature is transmitted to the controller after the gateway verifies that the controller is authorized to receive communication from the second controller.

13. The method of claim 8, wherein the vehicle is one of a car, a motorbike, a boat, and an aircraft.

14. The method of claim 8, wherein the controller signature is generated by the second controller using a private key associated with the second controller.

15. A non-transitory computer-readable storage medium storing instructions that when executed by a computer cause the computer to perform a method for communicating with a second controller of a vehicle, the method comprising:
- receiving data and a controller signature from the second controller, wherein the data comprises second instructions to be executed by the computer, and wherein the controller signature is generated based on at least a first portion of the data;
- transmitting the data and the controller signature to a gateway of the vehicle;
- receiving a gateway signature from the gateway, wherein the gateway signature is generated based on at least a second portion of the data and transmitted to the computer after the gateway verified the controller signature;
- verifying the gateway signature; and
- in response to verifying the gateway signature, processing the data by executing the second instructions.

16. The non-transitory computer-readable storage medium of claim 15, wherein the computer, the second controller, and the gateway are connected to a bus system.

17. The non-transitory computer-readable storage medium of claim 16, wherein the bus system is a controller-area network (CAN) bus system.

18. The non-transitory computer-readable storage medium of claim 16, wherein the data, the controller signature, and the gateway signature are received via the bus system and the data and the controller signature are transmitted via the bus system.

19. The non-transitory computer-readable storage medium of claim 15, wherein the gateway signature is transmitted to the controller after the gateway verifies that the computer is authorized to receive communication from the second controller.

20. The non-transitory computer-readable storage medium of claim 15, wherein the vehicle is one of a car, a motorbike, a boat, and an aircraft.

* * * * *